United States Patent
Sheik et al.

(10) Patent No.: US 12,207,147 B2
(45) Date of Patent: Jan. 21, 2025

(54) SMALL DATA TRANSMISSION TECHNIQUES IN WIRELESS COMMUNICATIONS

(71) Applicant: QUALCOMM Incorporated, San Diego, CA (US)

(72) Inventors: Ansah Ahmed Sheik, Hyderabad (IN); Chinmaya Padhy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 17/739,811

(22) Filed: May 9, 2022

(65) Prior Publication Data

US 2023/0362767 A1    Nov. 9, 2023

(51) Int. Cl.
*H04W 36/08* (2009.01)
*H04W 36/00* (2009.01)
*H04W 76/27* (2018.01)

(52) U.S. Cl.
CPC ....... *H04W 36/08* (2013.01); *H04W 36/0083* (2013.01); *H04W 76/27* (2018.02)

(58) Field of Classification Search
CPC .. H04W 36/08; H04W 36/0083; H04W 76/27
USPC ........................................................ 370/331
See application file for complete search history.

(56) References Cited

U.S. PATENT DOCUMENTS

| | | | | |
|---|---|---|---|---|
| 2021/0307055 A1* | 9/2021 | Tsai | ....................... | H04W 76/38 |
| 2021/0410180 A1* | 12/2021 | Tsai | ....................... | H04L 1/1883 |
| 2022/0039194 A1* | 2/2022 | Zhang | .................... | H04W 76/27 |
| 2022/0046749 A1* | 2/2022 | Lin | ......................... | H04W 76/19 |
| 2022/0095391 A1* | 3/2022 | Jo | ........................... | H04W 76/27 |
| 2023/0199895 A1* | 6/2023 | Zhang | .................... | H04W 76/27 |
| | | | | 370/329 |
| 2023/0262818 A1* | 8/2023 | Kim | ....................... | H04W 76/19 |
| | | | | 370/328 |
| 2023/0276530 A1* | 8/2023 | Jeon | ....................... | H04W 36/06 |
| | | | | 370/329 |
| 2024/0022903 A1* | 1/2024 | Wu | ....................... | H04W 12/037 |

FOREIGN PATENT DOCUMENTS

EP    3955696 A1    2/2022

OTHER PUBLICATIONS

International Search Report and Written Opinion—PCT/US2023/018671—ISA/EPO—Jul. 20, 2023.

(Continued)

*Primary Examiner* — Peter G Solinsky
(74) *Attorney, Agent, or Firm* — Dalei Dong; Holland & Hart LLP

(57) ABSTRACT

Methods, systems, and devices for wireless communications are described in which a user equipment (UE) may establish a connection with a network entity and transition to an inactive state in which a security context associated with the connection between the network entity and the UE is maintained. The UE may determine, based on a presence of data for transmission via the connection while in the inactive state, that one or more parameters associated with the connection meet a threshold criteria, and transmit the data via the connection while in the inactive state. The threshold criteria may be, for example, a cell energy of a serving cell associated with the connection, and an amount of data to be transmitted may be below a size threshold associated with a small data transmission.

18 Claims, 18 Drawing Sheets

(56) References Cited

OTHER PUBLICATIONS

ITRI: "Discussion on How to Handle Cell Reselection for the Case of Sdt", 3GPP Tsg Ran WG2#113, R2-2100826, 3rd Generation Partnership Project (3GPP), Mobile Competence Centre, 650, Route Des Lucioles, F-06921, Sophia-Antipolis Cedex, France, vol. RAN WG2, No. electronic, Jan. 25, 2021-Feb. 5, 2021, Jan. 15, 2021, pp. 1-2, XP051973923, The Whole Document.
Samsung: "Configured Grant Based Small Data Transmission", 3GPP TSG-RAN2 Meeting #112, R2-2009094, 3rd Generation Partnership Project (3GPP), Mobile Competence Centre, 650, Route Des Lucioles, F-06921, Sophia-Antipolis Cedex, France, vol. RAN WG2, No. Electronic, Nov. 2, 2020-Nov. 13, 2020, Oct. 23, 2020, 8 Pages, XP051942125, Section 2.2.
Xiaomi Communications: "Remaining Issues of CG-SDT in RAN2", 3GPP TSG-RAN WG2 Meeting #115, R2-2108792, 3rd Generation Partnership Project (3GPP), Mobile Competence Centre, 650, Route Des Lucioles, F-06921, Sophia-Antipolis Cedex, France, vol. RAN WG2, No. electronic, Aug. 9, 2021-Aug. 27, 2021, Aug. 6, 2021, 6 Pages, XP052035123, Section 2.6.1.

\* cited by examiner

SMALL DATA TRANSMISSION TECHNIQUES IN WIRELESS COMMUNICATIONS

FIELD OF TECHNOLOGY

The following relates to wireless communications, including small data transmission techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some cases, a UE may transmit relatively small amounts of data in one or multiple transmissions to another device. For example, a UE may transmit one or more sensor readings, status messages, or the like, to a network entity or another UE, which include a relatively small amount of data. In some cases, connection overhead associated with such small data transmissions may be significant, which may decrease overall network efficiency. Accordingly, efficient techniques for transmitting relatively small amounts of data may be desirable to enhance network efficiency and overall throughput.

SUMMARY

The described techniques relate to improved methods, systems, devices, and apparatuses that support small data transmission techniques in wireless communications. In accordance with various aspects, described techniques provide for a user equipment (UE) to establish a connection with a network entity for communications between the network entity and the UE. The UE may transition to an inactive state in which a security context associated with the connection between the network entity and the UE is maintained. The UE may determine, based on a presence of data for transmission via the connection while in the inactive state, that one or more parameters associated with the connection meet a threshold criteria, and transmit the data via the connection while in the inactive state based on the one or more parameters meeting the threshold criteria. In some cases, the threshold criteria may be a cell energy of a serving cell associated with the connection. In some cases, an amount of data to be transmitted may be below a size threshold associated with a small data transmission (SDT), and the UE may transmit the data in accordance with a random access channel (RACH) based transmission, or a configured grant based transmission.

In some cases, UE may receive a configuration of periodic resources for data transmission (e.g., in a configured grant) via a connection between the UE and a first cell while the connection is in an inactive state, and may determine, while in the inactive state, that a trigger is present for a priority-based cell reselection from the first cell to a second cell. In some cases, the UE may maintain the connection with the first cell, irrespective of the trigger for the priority-based cell reselection, based on one or more parameters associated with the connection with the first cell meeting a threshold criteria. In some cases, the UE may initiate the priority-based cell reselection subsequent to a completion of a data transfer (e.g., a SDT) using the periodic resources.

A method for wireless communication at a user equipment (UE) is described. The method may include establishing a connection with a network entity for communications between the network entity and the UE, transitioning to an inactive state in which a security context associated with the connection between the network entity and the UE is maintained, determining, based on a presence of data for transmission via the connection while in the inactive state, that one or more parameters associated with the connection meet a threshold criteria, and transmitting the data via the connection while in the inactive state based on the one or more parameters meeting the threshold criteria.

An apparatus for wireless communication at a UE is described. The apparatus may include a processor, memory coupled with the processor, and instructions stored in the memory. The instructions may be executable by the processor to cause the apparatus to establish a connection with a network entity for communications between the network entity and the UE, transition to an inactive state in which a security context associated with the connection between the network entity and the UE is maintained, determine, based on a presence of data for transmission via the connection while in the inactive state, that one or more parameters associated with the connection meet a threshold criteria, and transmit the data via the connection while in the inactive state based on the one or more parameters meeting the threshold criteria.

Another apparatus for wireless communication at a UE is described. The apparatus may include means for establishing a connection with a network entity for communications between the network entity and the UE, means for transitioning to an inactive state in which a security context associated with the connection between the network entity and the UE is maintained, means for determining, based on a presence of data for transmission via the connection while in the inactive state, that one or more parameters associated with the connection meet a threshold criteria, and means for transmitting the data via the connection while in the inactive state based on the one or more parameters meeting the threshold criteria.

A non-transitory computer-readable medium storing code for wireless communication at a UE is described. The code may include instructions executable by a processor to establish a connection with a network entity for communications between the network entity and the UE, transition to an inactive state in which a security context associated with the connection between the network entity and the UE is maintained, determine, based on a presence of data for transmission via the connection while in the inactive state, that one or more parameters associated with the connection meet a threshold criteria, and transmit the data via the connection while in the inactive state based on the one or more parameters meeting the threshold criteria.

Some examples of the method, apparatuses, and non-transitory computer-readable medium described herein may further include operations, features, means, or instructions for determining that the one or more parameters associated with the connection fail to meet the threshold criteria and delaying transmission of the data via the connection until the one or more parameters associated with the connection meet the threshold criteria. In some examples of the method, apparatuses, and non-transitory computer-readable medium described herein, the one or more parameters associated with the connection include a serving cell energy value.

Some examples of the method, apparatuses, and non-transitory computer-readable medium described herein may further include operations, features, means, or instructions for determining that a measurement periodicity for measuring the one or more parameters associated with the connection is set to provide a reduced period between measurements relative to a regular period between measurements and delaying transmission of the data via the connection until the measurement periodicity returns to provide the regular period between measurements. Some examples of the method, apparatuses, and non-transitory computer-readable medium described herein may further include operations, features, means, or instructions for determining that a neighbor cell search or measurement procedure is active at the UE and delaying transmission of the data via the connection until the neighbor cell search or measurement procedure is complete. Some examples of the method, apparatuses, and non-transitory computer-readable medium described herein may further include operations, features, means, or instructions for determining that a neighbor cell reselection timer is active at the UE and delaying transmission of the data via the connection until expiration of the neighbor cell reselection timer.

Some examples of the method, apparatuses, and non-transitory computer-readable medium described herein may further include operations, features, means, or instructions for determining, subsequent to initiating transmission of the data via the connection while in the inactive state, that a cell reselection procedure is triggered and delaying a start of the cell reselection procedure until completion of the transmission of the data via the connection while in the inactive state. In some examples of the method, apparatuses, and non-transitory computer-readable medium described herein, a search or measurement periodicity for cell reselection may be adjusted, based on an expected duration of the transmission of the data, to delay the start of the cell reselection procedure. Some examples of the method, apparatuses, and non-transitory computer-readable medium described herein may further include operations, features, means, or instructions for monitoring for an acknowledgment responsive to transmitting the data via the connection and initiating a cell reselection procedure, while maintaining the inactive state, responsive to a failure to decode the acknowledgment. Some examples of the method, apparatuses, and non-transitory computer-readable medium described herein may further include operations, features, means, or instructions for resuming transmission of the data subsequent to the cell reselection procedure. In some examples of the method, apparatuses, and non-transitory computer-readable medium described herein, an amount of the data for transmission via the connection while in the inactive state is less than a data threshold value for a small data transmission (SDT) for transmissions while in the inactive state.

A method for wireless communication at a UE is described. The method may include receiving configuration information for a set of periodic resources for transmission of data via a connection between the UE and a first cell while the connection is in an inactive state, transitioning the connection from an active state to the inactive state, determining, while in the inactive state, that a trigger is present for a priority-based cell reselection from the first cell to a second cell that has priority over the first cell, and maintaining the connection with the first cell, irrespective of the trigger for the priority-based cell reselection, based on one or more parameters associated with the connection with the first cell meeting a threshold criteria.

An apparatus for wireless communication at a UE is described. The apparatus may include a processor, memory coupled with the processor, and instructions stored in the memory. The instructions may be executable by the processor to cause the apparatus to receive configuration information for a set of periodic resources for transmission of data via a connection between the UE and a first cell while the connection is in an inactive state, transition the connection from an active state to the inactive state, determine, while in the inactive state, that a trigger is present for a priority-based cell reselection from the first cell to a second cell that has priority over the first cell, and maintain the connection with the first cell, irrespective of the trigger for the priority-based cell reselection, based on one or more parameters associated with the connection with the first cell meeting a threshold criteria.

Another apparatus for wireless communication at a UE is described. The apparatus may include means for receiving configuration information for a set of periodic resources for transmission of data via a connection between the UE and a first cell while the connection is in an inactive state, means for transitioning the connection from an active state to the inactive state, means for determining, while in the inactive state, that a trigger is present for a priority-based cell reselection from the first cell to a second cell that has priority over the first cell, and means for maintaining the connection with the first cell, irrespective of the trigger for the priority-based cell reselection, based on one or more parameters associated with the connection with the first cell meeting a threshold criteria.

A non-transitory computer-readable medium storing code for wireless communication at a UE is described. The code may include instructions executable by a processor to receive configuration information for a set of periodic resources for transmission of data via a connection between the UE and a first cell while the connection is in an inactive state, transition the connection from an active state to the inactive state, determine, while in the inactive state, that a trigger is present for a priority-based cell reselection from the first cell to a second cell that has priority over the first cell, and maintain the connection with the first cell, irrespective of the trigger for the priority-based cell reselection, based on one or more parameters associated with the connection with the first cell meeting a threshold criteria.

In some examples of the method, apparatuses, and non-transitory computer-readable medium described herein, the connection with the first cell is maintained responsive to a cell energy value associated with the first cell meeting the threshold criteria. Some examples of the method, apparatuses, and non-transitory computer-readable medium described herein may further include operations, features, means, or instructions for initiating the priority-based cell reselection to the second cell based on a cell energy value associated with the first cell being below the threshold criteria.

Some examples of the method, apparatuses, and non-transitory computer-readable medium described herein may further include operations, features, means, or instructions for maintaining the set of periodic resources for communications via the first cell and prioritizing the first cell for a subsequent cell reselection based on the set of periodic resources being maintained. Some examples of the method, apparatuses, and non-transitory computer-readable medium described herein may further include operations, features, means, or instructions for performing the subsequent cell reselection for communications via the first cell and transmitting data via the connection with the first cell using a periodic resource of the set of periodic resources, while in the inactive state. Some examples of the method, apparatuses, and non-transitory computer-readable medium described herein may further include operations, features, means, or instructions for determining, based on a presence of data for transmission, that one or more parameters associated with the first cell meet the threshold criteria and transmitting the data via the first cell while in the inactive state based on the one or more parameters meeting the threshold criteria.

DETAILED DESCRIPTION

Figure 1:
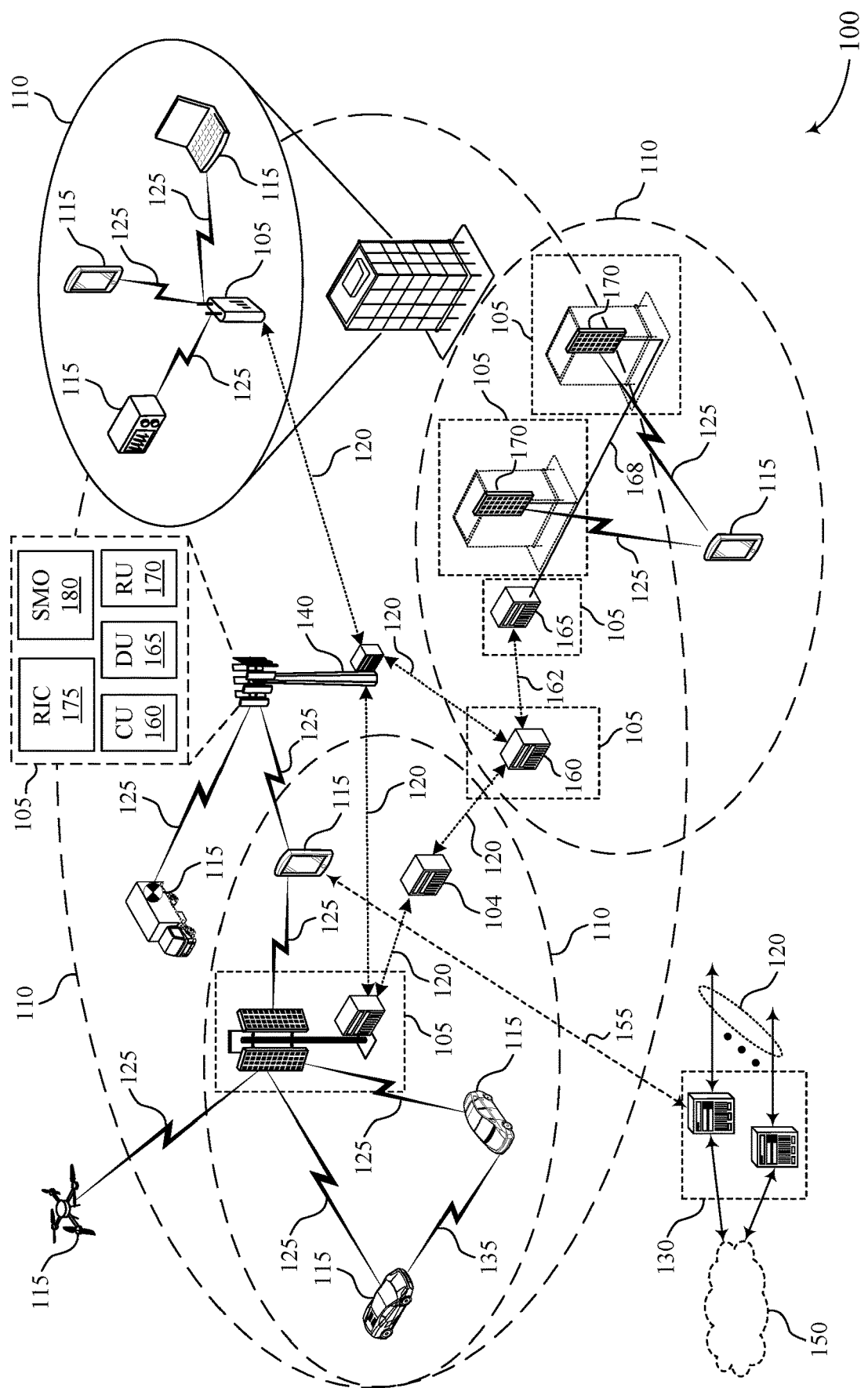
FIG. 1 illustrates an example of a wireless communications system that supports small data transmission techniques in wireless communications in accordance with one or more aspects of the present disclosure.

In some wireless communications systems, such as some fifth generation (5G) or new radio (NR) communications systems, a user equipment (UE) may establish a wireless connection with a network entity that supports data communications between the UE and network entity. For example, a radio resource control (RRC) connection establishment procedure may be performed to establish or reestablish a connection for a UE at a serving cell of the network. In some cases, the connection may be an active connection in which data is being transferred to or from the UE via wireless transmissions. In the event that data is no longer to be transmitted via the connection (e.g., when data in a data buffer at the UE and network entity has been transferred), the UE may transition to an idle state to conserve power and network resources. In such an idle state, various parameters associated with the connection may be released or no longer monitored, such as channel conditions or a security context associated with the connection. In the event that more data is to be transferred between the UE and the network, the UE may move out of idle state and perform another connection establishment or reestablishment procedure, which may consume a relatively large amount of time and involve several transmissions that consume network resources. In cases where a relatively small amount of data is to be transferred, such procedures can substantially increase overhead associated with the transmissions.

In order to enhance network efficiency, in some cases a UE may transition to an inactive state, in which in which the UE maintains a security context of a connection (e.g., a packet data convergence layer (PDCP) or network access stratum (NAS) security context) and can perform small data transfer (SDT) using a random access channel (RACH) procedure or using periodic resources (e.g., configured grant (CG) resources). The inactive state may allow for SDT (e.g., data transfer sizes less than a threshold value) without having to move the UE from an idle mode to an RRC connected mode, which can take time (e.g., 10 s or 100 s of milliseconds) and network resources. However, in the event that a SDT is interrupted, a UE may transition to the idle state, which then requires the UE to re-establish the connection, which can cause relatively long latency. In accordance with various aspects of the present disclosure, techniques are provided that may allow a UE to reduce the likelihood of a transition to an idle mode during a SDT procedure.

In some cases, prior to initiating a SDT, the UE may check that an energy level of a serving cell with an inactive state connection meets a threshold cell energy. If the threshold cell energy is present, the likelihood of the SDT procedure stalling and the UE moving to idle is reduced. In some cases, the UE may wait to start a SDT procedure when a search or measurement procedure is active at the UE, which could result in a cell reselection that, if initiated during an SDT procedure, may cause the UE to transition to an idle mode. By delaying the start of the SDT procedure until after the search or measurement procedure, the UE may maintain the inactive state through a potential cell reselection. Additionally, or alternatively, once a SDT procedure has started, the UE may refrain from starting a new search or measurement procedure until after the SDT is complete (e.g., by adjusting a search or measurement periodicity to allow for completion of the SDT procedure). In other cases, additionally, or alternatively, the UE may maintain the inactive state in the event of a random access message (e.g., MSG1 or MSG2) decoding failure, and trigger a cell reselection procedure. In some cases, a UE may be configured with periodic resources (e.g., configured grant resources) for SDT, and the UE may ignore a priority-based cell reselection (e.g., a priority reselection to a particular cell of a carrier, etc.) to a second cell if the UE has configured periodic resources for SDT on a first cell, unless a channel associated with the first cell has poor channel conditions. Further, in the event of a priority reselection, the UE may maintain the configured periodic resources of the first cell and include the first sell for a subsequent priority cell reselection. It is noted that while various examples discussed herein are for SDT transmissions, the techniques as discussed herein may be used in any types of communications where the UE is in an inactive state.

Techniques as discussed herein may allow for a UE to remain in an inactive state in some cases where the UE would otherwise transition to an idle state. As discussed, in cases where the UE transitions to an idle state, additional overhead may be consumed to establish or reestablish a connection for subsequent data transmissions. Thus, techniques described herein may provide power savings due to reduced connection establishment or reestablishment communications, enhanced resource utilization through reduced overhead, and reduced latency due to fewer interruptions in communications when a UE is in an inactive state. Overall network efficiency, latency, reliability, and user experience thus may be enhanced.

Aspects of the disclosure are initially described in the context of wireless communications systems. Aspects of the disclosure are further illustrated by and described with reference to process flows, apparatus diagrams, system diagrams, and flowcharts that relate to small data transmission techniques in wireless communications.

FIG. 1 illustrates an example of a wireless communications system 100 that supports small data transmission techniques in wireless communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support small data transmission techniques in wireless communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

In some cases, a UE 115 and a network entity 105 may establish a connection for communications, and the UE 115 may transition to an inactive state in which a security context associated with the connection between the network entity 105 and the UE 115 is maintained. The UE 115 may determine, based on a presence of data for transmission via the connection while in the inactive state, that one or more parameters associated with the connection meet a threshold criteria, and transmit the data via the connection while in the inactive state based on the one or more parameters meeting the threshold criteria. In some cases, the threshold criteria may be a cell energy of a serving cell associated with the connection. In some cases, an amount of data to be transmitted may be below a size threshold associated with a SDT, and the UE 115 may transmit the data in accordance with a RACH based transmission, or a configured grant based transmission. Additionally, or alternatively, a UE 115 may receive a configuration of periodic resources for data transmission (e.g., in a configured grant) via a connection between the UE 115 and a first cell while the connection is in an inactive state, and may determine, while in the inactive state, that a trigger is present for a priority-based cell reselection from the first cell to a second cell. In some cases, the UE 115 may maintain the connection with the first cell, irrespective of the trigger for the priority-based cell reselection, based on one or more parameters associated with the connection with the first cell meeting a threshold criteria. In some cases, the UE 115 may initiate the priority-based cell reselection subsequent to a completion of a data transfer (e.g., a SDT) using the periodic resources.

Figure 2:
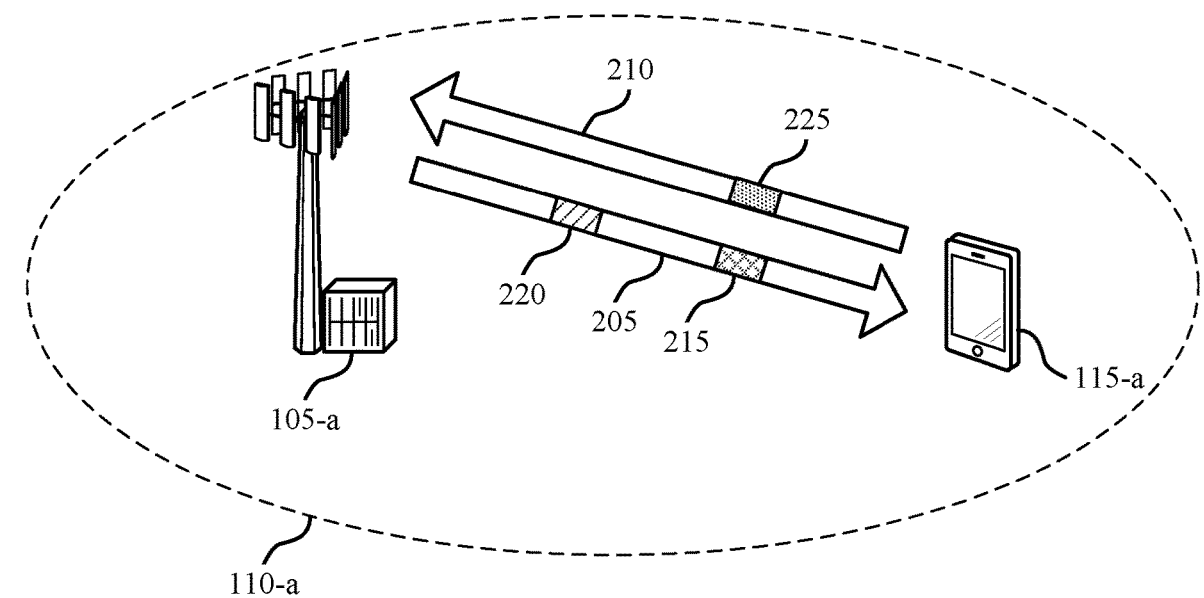
FIG. 2 illustrates an example of a wireless communications system that supports small data transmission techniques in wireless communications in accordance with one or more aspects of the present disclosure.
Figure 2:
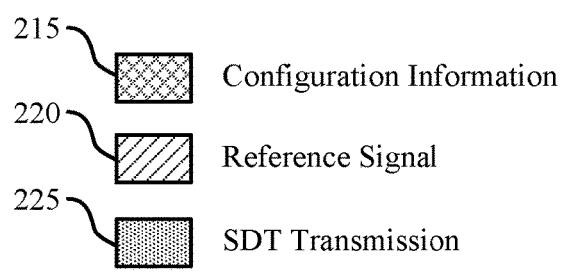

FIG. 2 illustrates an example of a wireless communications system 200 that supports small data transmission techniques in wireless communications in accordance with one or more aspects of the present disclosure. The wireless communications system 200 may include a network entity 105-*a* and a UE 115-*a*, which may represent examples of a network entity 105 and UE 115 as described with reference to FIG. 1. In this example, the UE 115-*a* may communicate with the network entity 105-*a* within coverage area 110-*a* via a downlink carrier 205 and an uplink carrier 210 (e.g., which may be different carriers operating using FDD, or a same carrier operating using TDD).

In some cases, the network entity 105-*a* may provide configuration information 215 to the UE 115-*a* that configures small data transfers from the UE 115-*a* to the network entity 105-*a*. In some cases, the configuration information 215 may be transmitted as part of a RRC configuration or reconfiguration procedure, and may enable data transmissions by the UE 115-*a* (e.g., SDT transmissions 225) while in an inactive state (e.g., and RRC inactive state) for relatively infrequent and small data without requiring the UE 115-*a* to transition to a connected state (e.g., an RRC Connected state) with the network entity 105-*a*. In some cases, data transfers while in the inactive state may be performed through a RAC-based data transfer or a periodic resource (e.g., configured grant) based data transfer, which may enable data transfers with reduced signaling overhead to reduce physical resource usage associated with such transfers. In some cases, if the UE 115-*a* is in an inactive state and a small amount of data is to be transferred in a SDT transmission 225, the UE 115-*a* may transmit SDT transmission 225 without transitioning to the active state. However, in the event that the SDT transmission 225 is interrupted and is not completed, (e.g., due to a radio link failure (RLF), handover of the UE 115-*a* to a different serving cell, etc.), the UE 115-*a* may transition to the idle mode, and the connection will be reestablished prior to performing a further data transfer. Such situations may result in increased overhead, additional transmissions and associated power consumption associated with the connection reestablishment, and increased latency, compared to cases where the UE 115-*a* can complete the data transfer while remaining in the inactive state.

In accordance with techniques discussed herein, a likelihood of a SDT transmission 225 being interrupted may be reduced, and thus the likelihood of the UE 115-*a* transitioning to the idle state may also be reduced. In some cases, the UE 115-*a* may measure one or more reference signals 220 from the network entity 105-*a*, and may perform the procedure to transmit the SDT transmission 225 when one or more channel conditions meet a threshold value. In some cases, the UE 115-*a* may measure a cell energy based on the one or more reference signals 220, prior to a SDT transmission 225. If the current serving cell energy value is below a threshold value (e.g., a threshold value that may be configured in the configuration information 215, or that is otherwise provided or signaled to the UE 115-*a*) then the UE 115-*a* may delay the SDT transmission 225, which may allow channel conditions to improve or a cell reselection procedure to be performed. In some cases, the UE 115-*a* may maintain the inactive state through a cell reselection procedure, and thus one the procedure is completed the UE 115-*a* may transmit the SDT transmission 225 while in the inactive mode. In some cases, the UE 115-*a* may be in a mode in which channel conditions are being measured at an increased frequency relative to a regular measurement periodicity (e.g., the UE 115-*a* may be in a panic mode in which increased channel measurements may be taken in order to ensure a current beam or serving cell provides adequate communications reliability, or to facilitate a beam switch or serving cell reselection that provides better communications reliability). In some cases, the UE 115-*a* may refrain from transmitting the SDT transmission 225 when in a mode that has such increased channel measurements. Such techniques may reduce the likelihood of a SDT transmission 225 from being interrupted and the UE 115-*a* transitioning to the idle mode.

In some cases, the UE 115-*a* may perform the SDT transmission 225 based on whether the UE 115-*a* has an active neighbor cell search or measurement procedure. In such cases, the neighbor cell search or measurement procedure may result in a change in the serving cell of the UE 115-*a*, and if such a change were to occur during a SDT transmission 225 the UE 115-*a* may transition to the idle mode. In cases where the UE 115-*a* determines that there is not a current neighbor cell search or measurement procedure ongoing, the UE 115-*a* may proceed with the SDT transmission 225. In the event that a neighbor cell search or measurement procedure (e.g., a Srch/Meas is ongoing on any configured neighbor cells, along with an active reselection timer ($T_{reset}$)) is ongoing, the UE 115-*a* may delay the SDT transmission 225.

In some cases, the UE 115-*a* may avoid priority-based cell reselection during a SDT transmission 225 while in the inactive state. For example, the UE 115-*a* may avoid priority-based reselection in the inactive state while the SDT transmission 225 procedure is active, for one or more neighbor cells (e.g., that may be configured by the network entity 105-*a*). In some cases, while the SDT transmission 225 procedure is active, the UE 115-*a* may increase a time between neighbor cell search or measurement procedure (e.g., through adjustment of a Srch/Meas periodicity of neighbor cells configured at the UE 115-*a*). Such an adjustment may allow the UE 115-*a* to avoid reselection during the SDT transmission 225 procedure. After the SDT transmission 225 is complete, the UE 115-*a* may perform the search or measurement procedure, or reset the associated timer or periodicity back to a pre-adjusted or regular value. For example, the network entity 105-*a* may configure a first serving cell for communications, and a neighbor cell may be present that satisfies a criteria for reselection from the first serving cell to the neighbor cell. In such a case, upon identifying that data is present for a SDT transmission 225, the UE may adjust the neighbor cell search or measurement procedure periodicity (e.g., by changing a measurement from once during each discontinuous reception (DRX) cycle to once every two DRX cycles or some other multiple of DRX cycles) to avoid initiating the neighbor cell search or measurement procedure until after completion of the SDT transmission 225. Such a technique may reduce the likelihood that the UE 115-*a* transitions to idle mode during the SDT transmission 225 (e.g., due to a cell reselection procedure being triggered), and thus may reduce a latency associated with an interrupted SDT transmission 225. Once the SDT transmission 225 procedure is complete the UE 115-*a* may adjust the neighbor cell search or measurement procedure back to the regular or pre-adjustment value (e.g., once for each DRX cycle).

In some cases, additionally, or alternatively, in the event of an interruption in the SDT transmission 225 (e.g., in the event of a failure to decode a RACH message associated with the SDT transmission 225). rather than transitioning to the idle mode, the UE 115-*a* may move back to the inactive state and trigger a cell selection to a better cell, after which the UE 115-*a* may resume the SDT transmission 225.

In further cases, the UE 115-*a* may be configured with periodic resources (e.g., CG resources) that may be used for one or more SDT transmissions 225. In such cases, the periodic resources may be valid for a specific cell, such as a first cell, in which the UE 115-*a* entered the inactive state. When a cell reselection is triggered and the UE 115-*a* is moved to a second cell, such periodic resources of the first cell may no longer be valid. In order to reduce the likelihood that such periodic resources are invalidated, in some cases, even if the UE 115-*a* is moved out of a first cell due to a measured cell energy being below a threshold value, the periodic resources may be retained, and the first cell may be prioritized in a prioritized cell reselection procedure. Thus, in the event of a prioritized cell reselection while the UE 115-*a* is using the second cell, the first cell may have an increased priority and higher likelihood of selection to that the previously configured periodic resources may be used. In some cases, the periodic resources may be maintained at the first cell for a configurable period of time following a cell reselection to the second cell, before being released by the UE 115-*a* and the network entity 105-*a*.

Further, in some cases in order to maintain a grant of periodic resources at a first cell, the UE 115-*a* may maintain the connection with the first cell even in the event a priority-based cell reselection procedure is triggered (e.g., a procedure to switch to a prioritized second cell if a reselection criteria is met), if one or more measurement parameters associated with the first cell meet a threshold criteria (e.g., a cell energy of the first cell meets a cell energy threshold). Thus, in such cases, the UE 115-*a* may maintain the connection with the first cell irrespective of the trigger for the priority-based cell selection if one or more channel parameters associated with the first cell meet the threshold criteria. Such techniques may allow for granted periodic resources to be maintained for SDT transmissions 225, which may help to enhance the efficiency of communications, as well as help reduce latency associated with SDT transmissions 225.

Figure 3:
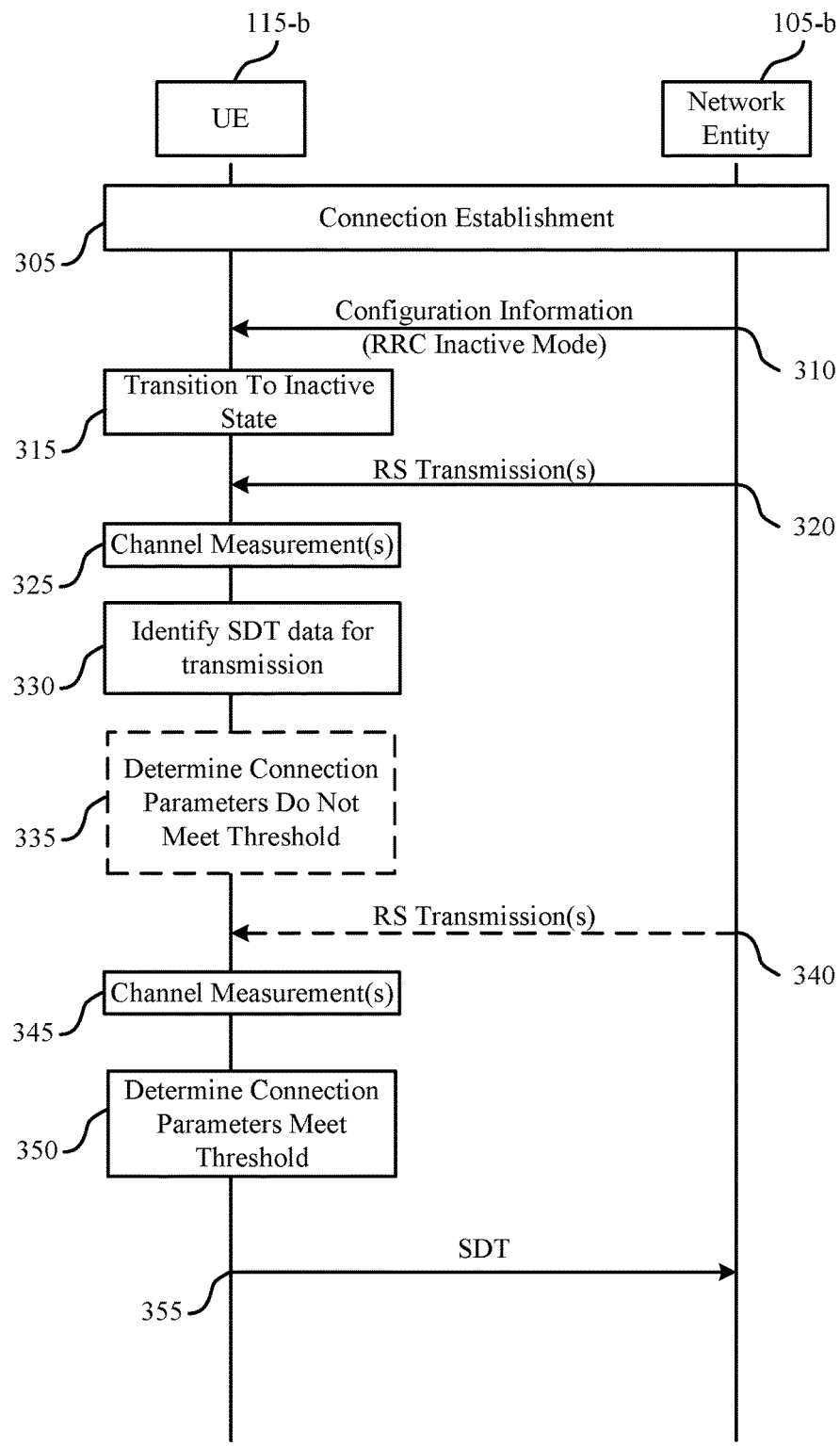
FIG. 3 illustrates an example of a process flow that supports small data transmission techniques in wireless communications in accordance with one or more aspects of the present disclosure.

FIG. 3 illustrates an example of a process flow 300 that supports small data transmission techniques in wireless communications in accordance with one or more aspects of the present disclosure. The process flow 300 may include various aspects of the present disclosure described with reference to FIGS. 1 and 2. For example, the process flow 300 may illustrate communications between a UE 115-*b* and a network entity 105-*b*, which may be examples of corresponding devices as described with reference to FIGS. 1 and 2. Alternative examples of the following may be implemented, where some steps are performed in a different order than described or are not performed at all. In some cases, a step may include additional features not mentioned below, or further steps may be added.

At 305, the network entity 105-*b* and UE 115-*b* may establish a connection for communications. In some cases, the connection establishment may be performed in accordance with connection establishment techniques for a wireless communication system (e.g., through a RRC connection establishment or reestablishment procedure). In some cases, the connection establishment procedure may provide a security context for secure communications between the UE 115-*b* and network entity 105-*b* (e.g., a PDCP security context, a NAS security context, etc.).

At 310, the network entity 105-*b* may transmit configuration information to the UE 115-*b*. The configuration information may include, for example, configuration for data transmissions by the UE 115-*b* while in an inactive mode. In some cases, the configuration information may include one or more parameter threshold values for performing data transfer procedures while in the inactive state (e.g., cell energy parameter threshold values, reference signal received power (RSRP) threshold values, reference signal received quality (RSRQ) threshold values, signal to interference and noise (SINR) values, or any combinations thereof). The configuration information may be provided in RRC signaling (e.g., as part of the connection establishment procedure or separately from the connection establishment procedure), for example.

At 315, the UE 115-*b* may transition to the inactive state. In some cases, the transition to the inactive state may occur after a data buffer is empty of data that is to be transferred to or from the UE 115-*b*. In some cases, the UE 115-*b* and the network entity 105-*b* may maintain a security context for the connection when the UE 115-*b* transitions to the inactive state.

At 320, the network entity 105-*b* may transmit one or more reference signals that may be used for channel measurements at one or more UEs. At 325, the UE 115-*b* may perform channel measurement(s) based on the reference signals. Such reference signal(s) may include any signals that may be measured to evaluate a channel that is present for wireless communications of the UE 115-*b*, such as a channel state information (CSI) reference signal, a demodulation reference signal (DMRS), a phase tracking reference signal, a synchronization signal, or any combinations thereof.

At 330, the UE 115-*b* may identify data for transfer while in the inactive mode (e.g., SDT data). In some cases, the data may be identified based on an amount of the data being below a threshold data size for transmission while in the inactive state. In some cases, the threshold data size may be associated with a payload that may be included in one or multiple RACH transmissions (e.g., RACH MSG1 or MSG2 transmissions that may include a payload for SDT), when RACH-based SDT is configured. In other cases, the threshold data size may be associated with an amount of resources provided in configured periodic resources (e.g., CG resources) for SDT transmissions. At 335, in the event that the channel measurements are below the threshold value, the UE 115-*b* may identify that the connection parameters do not meet the threshold criteria for a data transmission while in inactive mode. In such cases, at 340, the network entity 105-*b* may transmit one or more further reference signal transmissions (e.g., according to a reference signal transmission periodicity) that may be measured by the UE 115-*b* at 345. In some cases, if further channel measurements are relatively poor or if a neighbor cell is measured to have channel parameters that are better than those of the current serving cell, the UE 115-*b* may trigger a cell reselection procedure to reselect to a cell having better channel quality. In some cases, the inactive mode at the UE 115-*b* may persist through such a cell reselection.

At 350, the UE 115-*b* may determine that the one or more measured connection parameters meet the threshold value. As discussed herein, in some cases the measured connection parameters may include a cell energy, and the UE 115-*b* may refrain from initiating a data transfer while in the inactive state in the cell energy is below the threshold value. At 355, based on the one or more measured connection parameters meeting the threshold value, the UE 115-*b* may transmit the data to the network entity 105-*b* (e.g., in a SDT). In some cases, the transmission may be a RACH-based SDT, and the UE 115-*b* may receive a network-based response as a contention-based acknowledgment that confirms successful receipt of the data transfer. In some cases, as discussed herein, in the event that the UE 115-*b* does not receive such a contention-based acknowledgment, it may maintain the inactive state and may trigger a cell reselection rather than transition to an idle mode.

Figure 4:
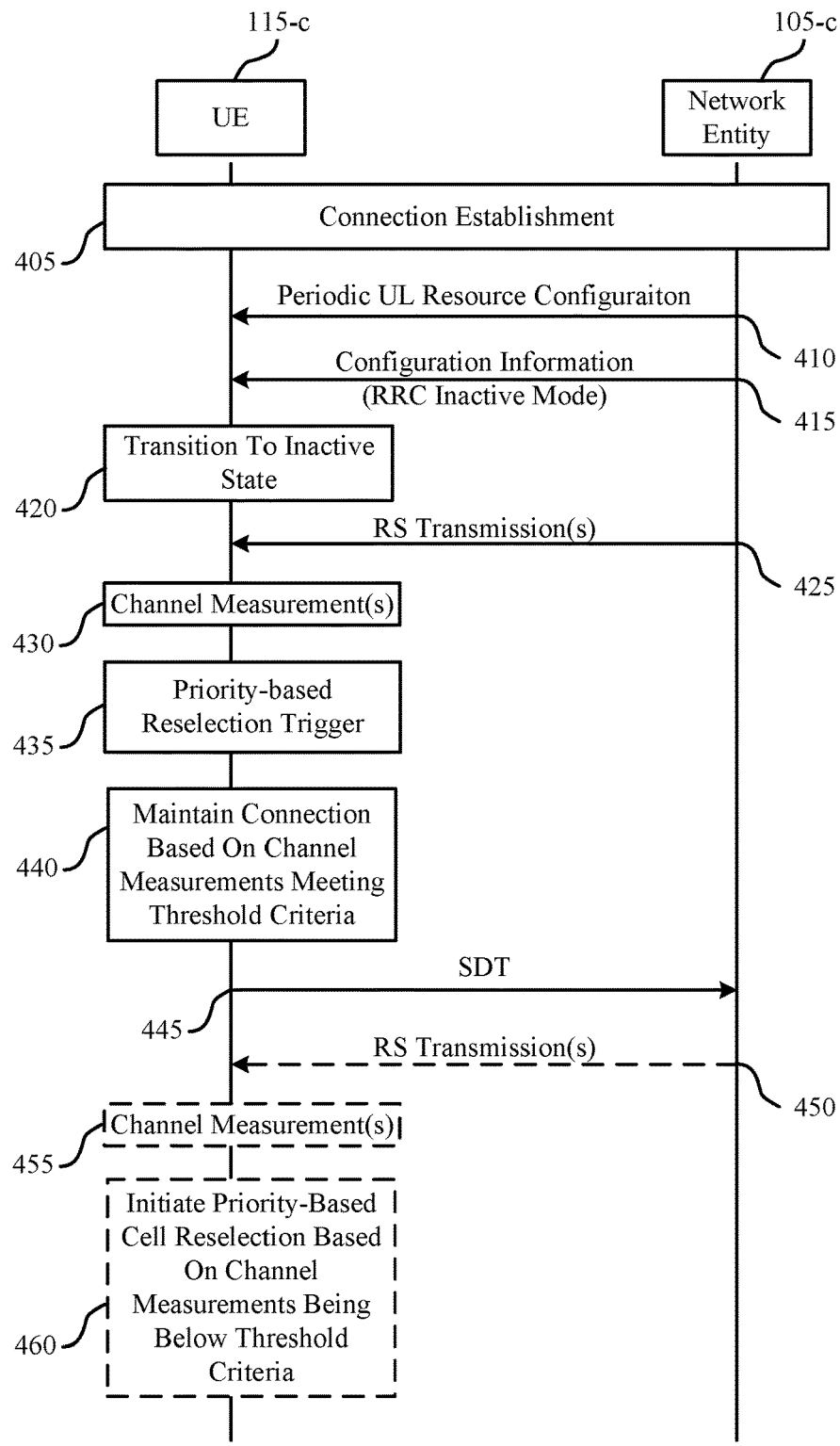
FIG. 4 illustrates an example of a process flow that supports small data transmission techniques in wireless communications in accordance with one or more aspects of the present disclosure.

FIG. 4 illustrates an example of a process flow 400 that supports small data transmission techniques in wireless communications in accordance with one or more aspects of the present disclosure. The process flow 400 may include various aspects of the present disclosure described with reference to FIGS. 1 through 3. For example, the process flow 400 may illustrate communications between a UE 115-*c* and a network entity 105-*c*, which may be examples of corresponding devices as described with reference to FIGS. 1 through 3. Alternative examples of the following may be implemented, where some steps are performed in a different order than described or are not performed at all. In some cases, a step may include additional features not mentioned below, or further steps may be added.

At 405, the network entity 105-*c* and UE 115-*c* may establish a connection for communications. In some cases, the connection establishment may be performed in accordance with connection establishment techniques for a wireless communication system (e.g., through a RRC connection establishment or reestablishment procedure). In some cases, the connection establishment procedure may provide a security context for secure communications between the UE 115-*c* and network entity 105-*c* (e.g., a PDCP security context, a NAS security context, etc.).

At 410, the network entity 105-*c* may provide a periodic uplink resource configuration. In some cases, the periodic uplink resource configuration may provide resources for uplink transmissions of data from the UE 115-*c* while in the RRC inactive mode (e.g., configured grant resources). In some cases, the periodic uplink resources may be shared among multiple UEs, and the UE 115-*c* may scramble uplink transmissions based on an identification, which may allow for unambiguous identification of an uplink transmission as being associated with the UE 115-*c*.

At 415, the network entity 105-*c* may transmit configuration information to the UE 115-*c*. The configuration information may include, for example, configuration for data transmissions by the UE 115-*c* while in an inactive mode. In some cases, the configuration information may include one or more parameter threshold values for performing data transfer procedures while in the inactive state (e.g., cell energy parameter threshold values, reference signal received power (RSRP) threshold values, reference signal received quality (RSRQ) threshold values, signal to interference and noise (SINR) values, or any combinations thereof). Additionally, or alternatively, the configuration information may include parameter values for maintaining a connection with a cell associated with configured periodic uplink resources even in the event of a priority-based cell reselection trigger associated with a different cell that has a reselection priority, as discussed herein. The configuration information may be provided in RRC signaling (e.g., as part of the connection establishment procedure or separately from the connection establishment procedure), for example.

At 420, the UE 115-*c* may transition to the inactive state. In some cases, the transition to the inactive state may occur after a data buffer is empty of data that is to be transferred to or from the UE 115-*c*. In some cases, the UE 115-*c* and the network entity 105-*c* may maintain a security context for the connection when the UE 115-*c* transitions to the inactive state.

At 425, the network entity 105-*c* may transmit one or more reference signals that may be used for channel measurements at one or more UEs. At 430, the UE 115-*c* may perform channel measurement(s) based on the reference signals. Such reference signal(s) may include any signals that may be measured to evaluate a channel that is present for wireless communications of the UE 115-*c*, such as a CSI reference signal, a DMRS, a phase tracking reference signal, a synchronization signal, or any combinations thereof.

At 435, the UE 115-*c* may identify a presence of a priority-based reselection trigger. In some cases, the priority-based reselection trigger may be triggered based on a reselection timer associated with a serving cell that has a reselection priority over other serving cells. At 440, the UE 115-*c* may maintain the connection with the existing serving cell of the network entity 105-*c* that has the periodic uplink resources configured, based on the existing serving cell having channel measurements that meet a threshold criteria (e.g., based on a configured parameter value provided with configuration information from the network entity 105-*c*).

At 445, the UE 115-*c* may identify data for transfer while in the inactive mode (e.g., SDT data), and may transmit the data to the network entity 105-*c* using an uplink resource of the configured periodic uplink resources. In some cases, the data may be identified based on an amount of the data being below a threshold data size for transmission while in the inactive state. In some cases, the threshold data size may be associated with a payload that may be included in one or multiple configured periodic resources for SDT transmissions.

Optionally, at 450, the network entity 105-*c* may transmit one or more further reference signal transmissions (e.g., according to a reference signal transmission periodicity) that may be measured by the UE 115-*c* at 455. In some cases, at 460, if further channel measurements do not meet the threshold criteria, the UE 115-*c* may initiate the priority-based cell reselection. In some cases, the UE 115-*c* and network entity 105-*c* may maintain the configured periodic uplink resources, and the UE 115-*c* may prioritize the cell associated with the configured periodic uplink resources in subsequent cell reselection procedures.

Figure 5:
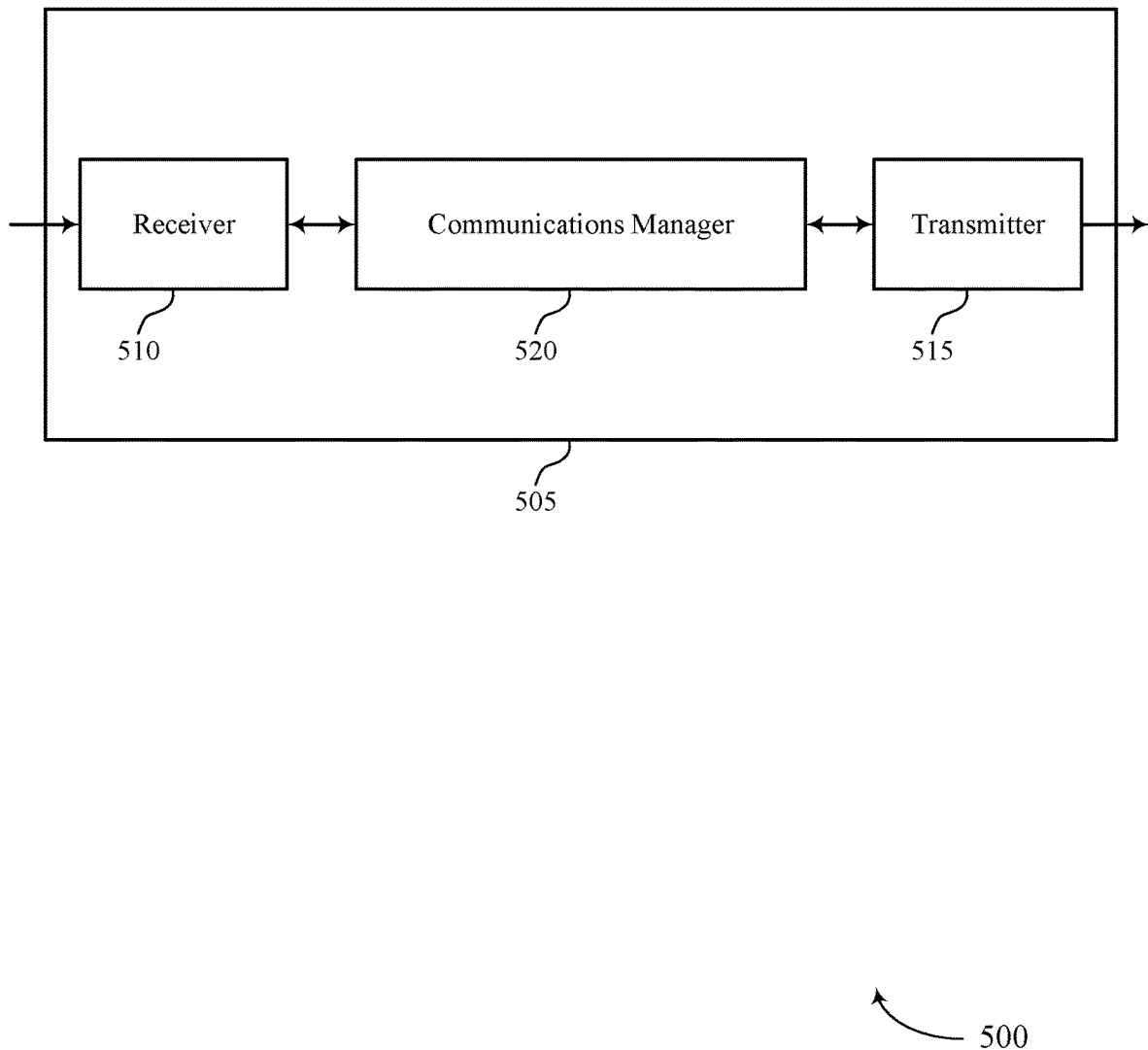
FIGS. 5 and 6 show block diagrams of devices that support small data transmission techniques in wireless communications in accordance with one or more aspects of the present disclosure.

FIG. 5 shows a block diagram 500 of a device 505 that supports small data transmission techniques in wireless communications in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to small data transmission techniques in wireless communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to small data transmission techniques in wireless communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of small data transmission techniques in wireless communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for establishing a connection with a network entity for communications between the network entity and the UE. The communications manager 520 may be configured as or otherwise support a means for transitioning to an inactive state in which a security context associated with the connection between the network entity and the UE is maintained. The communications manager 520 may be configured as or otherwise support a means for determining, based on a presence of data for transmission via the connection while in the inactive state, that one or more parameters associated with the connection meet a threshold criteria. The communications manager 520 may be configured as or otherwise support a means for transmitting the data via the connection while in the inactive state based on the one or more parameters meeting the threshold criteria.

Additionally, or alternatively, the communications manager 520 may support wireless communication at a UE in accordance with examples as disclosed herein. For example, the communications manager 520 may be configured as or otherwise support a means for receiving configuration information for a set of periodic resources for transmission of data via a connection between the UE and a first cell while the connection is in an inactive state. The communications manager 520 may be configured as or otherwise support a means for transitioning the connection from an active state to the inactive state. The communications manager 520 may be configured as or otherwise support a means for determining, while in the inactive state, that a trigger is present for a priority-based cell reselection from the first cell to a second cell that has priority over the first cell. The communications manager 520 may be configured as or otherwise support a means for maintaining the connection with the first cell, irrespective of the trigger for the priority-based cell reselection, based on one or more parameters associated with the connection with the first cell meeting a threshold criteria.

By including or configuring the communications manager 520 in accordance with examples as described herein, the device 505 (e.g., a processor controlling or otherwise coupled with the receiver 510, the transmitter 515, the communications manager 520, or a combination thereof) may support techniques that allow a UE to remain in an inactive state in some cases where the UE would otherwise transition to an idle state. Such techniques may provide power savings due to reduced connection establishment or reestablishment communications, enhanced resource utilization through reduced overhead, and reduced latency due to fewer interruptions in communications when a UE is in an inactive state. Overall network efficiency, latency, reliability, and user experience thus may be enhanced.

Figure 6:
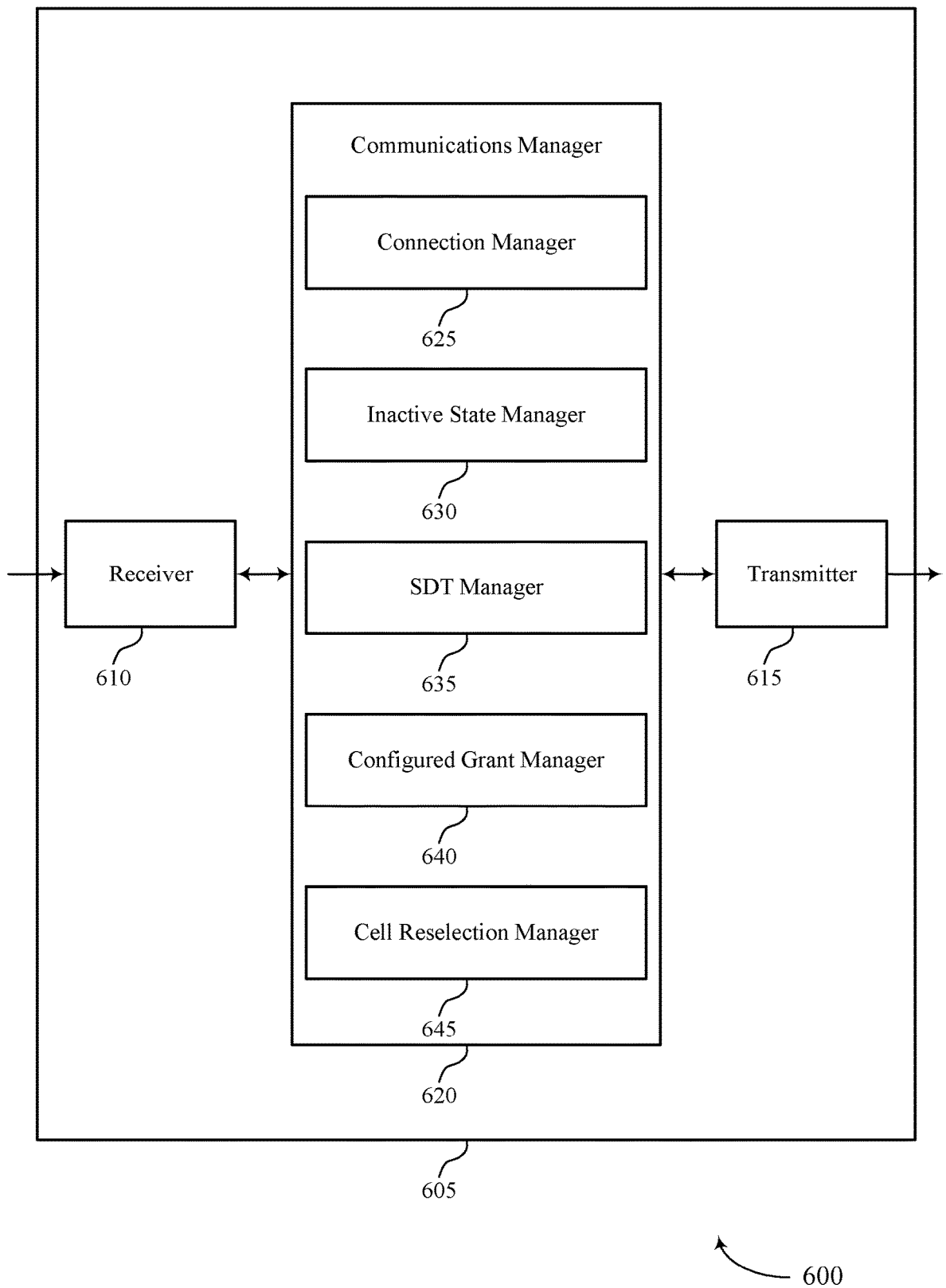

FIG. 6 shows a block diagram 600 of a device 605 that supports small data transmission techniques in wireless communications in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to small data transmission techniques in wireless communications). Information may be passed on to other components of the device 605. The receiver 610 may utilize a single antenna or a set of multiple antennas.

The transmitter 615 may provide a means for transmitting signals generated by other components of the device 605.

For example, the transmitter 615 may transmit information such as packets, user data, control information, or any combination thereof associated with various information channels (e.g., control channels, data channels, information channels related to small data transmission techniques in wireless communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of small data transmission techniques in wireless communications as described herein. For example, the communications manager 620 may include a connection manager 625, an inactive state manager 630, an SDT manager 635, a configured grant manager 640, a cell reselection manager 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The connection manager 625 may be configured as or otherwise support a means for establishing a connection with a network entity for communications between the network entity and the UE. The inactive state manager 630 may be configured as or otherwise support a means for transitioning to an inactive state in which a security context associated with the connection between the network entity and the UE is maintained. The SDT manager 635 may be configured as or otherwise support a means for determining, based on a presence of data for transmission via the connection while in the inactive state, that one or more parameters associated with the connection meet a threshold criteria. The SDT manager 635 may be configured as or otherwise support a means for transmitting the data via the connection while in the inactive state based on the one or more parameters meeting the threshold criteria.

Additionally, or alternatively, the communications manager 620 may support wireless communication at a UE in accordance with examples as disclosed herein. The configured grant manager 640 may be configured as or otherwise support a means for receiving configuration information for a set of periodic resources for transmission of data via a connection between the UE and a first cell while the connection is in an inactive state. The inactive state manager 630 may be configured as or otherwise support a means for transitioning the connection from an active state to the inactive state. The cell reselection manager 645 may be configured as or otherwise support a means for determining, while in the inactive state, that a trigger is present for a priority-based cell reselection from the first cell to a second cell that has priority over the first cell. The cell reselection manager 645 may be configured as or otherwise support a means for maintaining the connection with the first cell, irrespective of the trigger for the priority-based cell reselection, based on one or more parameters associated with the connection with the first cell meeting a threshold criteria.

Figure 7:
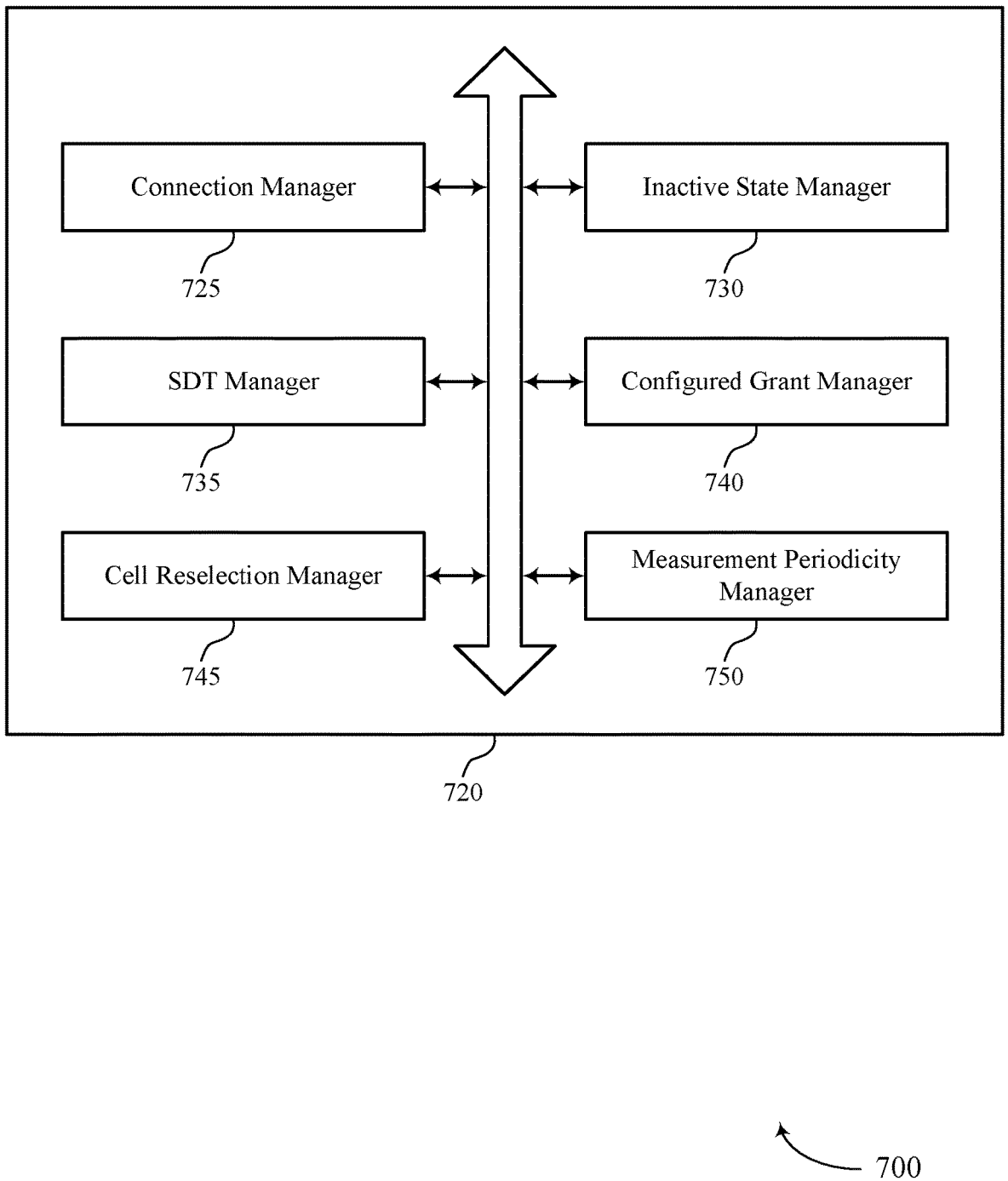
FIG. 7 shows a block diagram of a communications manager that supports small data transmission techniques in wireless communications in accordance with one or more aspects of the present disclosure.

FIG. 7 shows a block diagram 700 of a communications manager 720 that supports small data transmission techniques in wireless communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of small data transmission techniques in wireless communications as described herein. For example, the communications manager 720 may include a connection manager 725, an inactive state manager 730, an SDT manager 735, a configured grant manager 740, a cell reselection manager 745, a measurement periodicity manager 750, or any combination thereof. Each of these components may communicate, directly or indirectly, with one another (e.g., via one or more buses).

The communications manager 720 may support wireless communication at a UE in accordance with examples as disclosed herein. The connection manager 725 may be configured as or otherwise support a means for establishing a connection with a network entity for communications between the network entity and the UE. The inactive state manager 730 may be configured as or otherwise support a means for transitioning to an inactive state in which a security context associated with the connection between the network entity and the UE is maintained. The SDT manager 735 may be configured as or otherwise support a means for determining, based on a presence of data for transmission via the connection while in the inactive state, that one or more parameters associated with the connection meet a threshold criteria. In some examples, the SDT manager 735 may be configured as or otherwise support a means for transmitting the data via the connection while in the inactive state based on the one or more parameters meeting the threshold criteria.

In some examples, the SDT manager 735 may be configured as or otherwise support a means for determining that the one or more parameters associated with the connection fail to meet the threshold criteria. In some examples, the SDT manager 735 may be configured as or otherwise support a means for delaying transmission of the data via the connection until the one or more parameters associated with the connection meet a threshold criteria. In some examples, the one or more parameters associated with the connection include a serving cell energy value.

In some examples, the measurement periodicity manager 750 may be configured as or otherwise support a means for determining that a measurement periodicity for measuring the one or more parameters associated with the connection is set to provide a reduced period between measurements relative to a regular period between measurements. In some examples, the measurement periodicity manager 750 may be configured as or otherwise support a means for delaying transmission of the data via the connection until the measurement periodicity returns to provide the regular period between measurements. In some examples, the cell reselection manager 745 may be configured as or otherwise support a means for determining that a neighbor cell search or measurement procedure is active at the UE. In some examples, the cell reselection manager 745 may be configured as or otherwise support a means for delaying transmission of the data via the connection until the neighbor cell search or measurement procedure is complete.

In some examples, the cell reselection manager 745 may be configured as or otherwise support a means for determining that a neighbor cell reselection timer is active at the UE. In some examples, the cell reselection manager 745 may be configured as or otherwise support a means for delaying transmission of the data via the connection until expiration of the neighbor cell reselection timer. In some examples, the cell reselection manager 745 may be configured as or otherwise support a means for determining, subsequent to initiating transmission of the data via the connection while in the inactive state, that a cell reselection procedure is triggered. In some examples, the cell reselection manager 745 may be configured as or otherwise support a means for delaying a start of the cell reselection procedure until completion of the transmission of the data via the connection while in the inactive state. In some examples, a search or measurement periodicity for cell reselection is adjusted, based on an expected duration of the transmission of the data, to delay the start of the cell reselection procedure.

In some examples, the cell reselection manager 745 may be configured as or otherwise support a means for monitoring for an acknowledgment responsive to transmitting the data via the connection. In some examples, the cell reselection manager 745 may be configured as or otherwise support a means for initiating a cell reselection procedure, while maintaining the inactive state, responsive to a failure to decode the acknowledgment. In some examples, the SDT manager 735 may be configured as or otherwise support a means for resuming transmission of the data subsequent to the cell reselection procedure. In some examples, an amount of the data for transmission via the connection while in the inactive state is less than a data threshold value for a small data transmission (SDT) for transmissions while in the inactive state.

Additionally, or alternatively, the communications manager 720 may support wireless communication at a UE in accordance with examples as disclosed herein. The configured grant manager 740 may be configured as or otherwise support a means for receiving configuration information for a set of periodic resources for transmission of data via a connection between the UE and a first cell while the connection is in an inactive state. In some examples, the inactive state manager 730 may be configured as or otherwise support a means for transitioning the connection from an active state to the inactive state. The cell reselection manager 745 may be configured as or otherwise support a means for determining, while in the inactive state, that a trigger is present for a priority-based cell reselection from the first cell to a second cell that has priority over the first cell. In some examples, the cell reselection manager 745 may be configured as or otherwise support a means for maintaining the connection with the first cell, irrespective of the trigger for the priority-based cell reselection, based on one or more parameters associated with the connection with the first cell meeting a threshold criteria.

In some examples, the connection with the first cell is maintained responsive to a cell energy value associated with the first cell meeting the threshold criteria.

In some examples, the cell reselection manager 745 may be configured as or otherwise support a means for initiating the priority-based cell reselection to the second cell based on a cell energy value associated with the first cell being below the threshold criteria. In some examples, the configured grant manager 740 may be configured as or otherwise support a means for maintaining the set of periodic resources for communications via the first cell. In some examples, the configured grant manager 740 may be configured as or otherwise support a means for prioritizing the first cell for a subsequent cell reselection based on the set of periodic resources being maintained.

In some examples, the cell reselection manager 745 may be configured as or otherwise support a means for performing the subsequent cell reselection for communications via the first cell. In some examples, the SDT manager 735 may be configured as or otherwise support a means for transmitting data via the connection with the first cell using a periodic resource of the set of periodic resources, while in the inactive state. In some examples, the SDT manager 735 may be configured as or otherwise support a means for determining, based on a presence of data for transmission, that one or more parameters associated with the first cell meet the threshold criteria. In some examples, the SDT manager 735 may be configured as or otherwise support a means for transmitting the data via the first cell while in the inactive state based on the one or more parameters meeting the threshold criteria.

Figure 8:
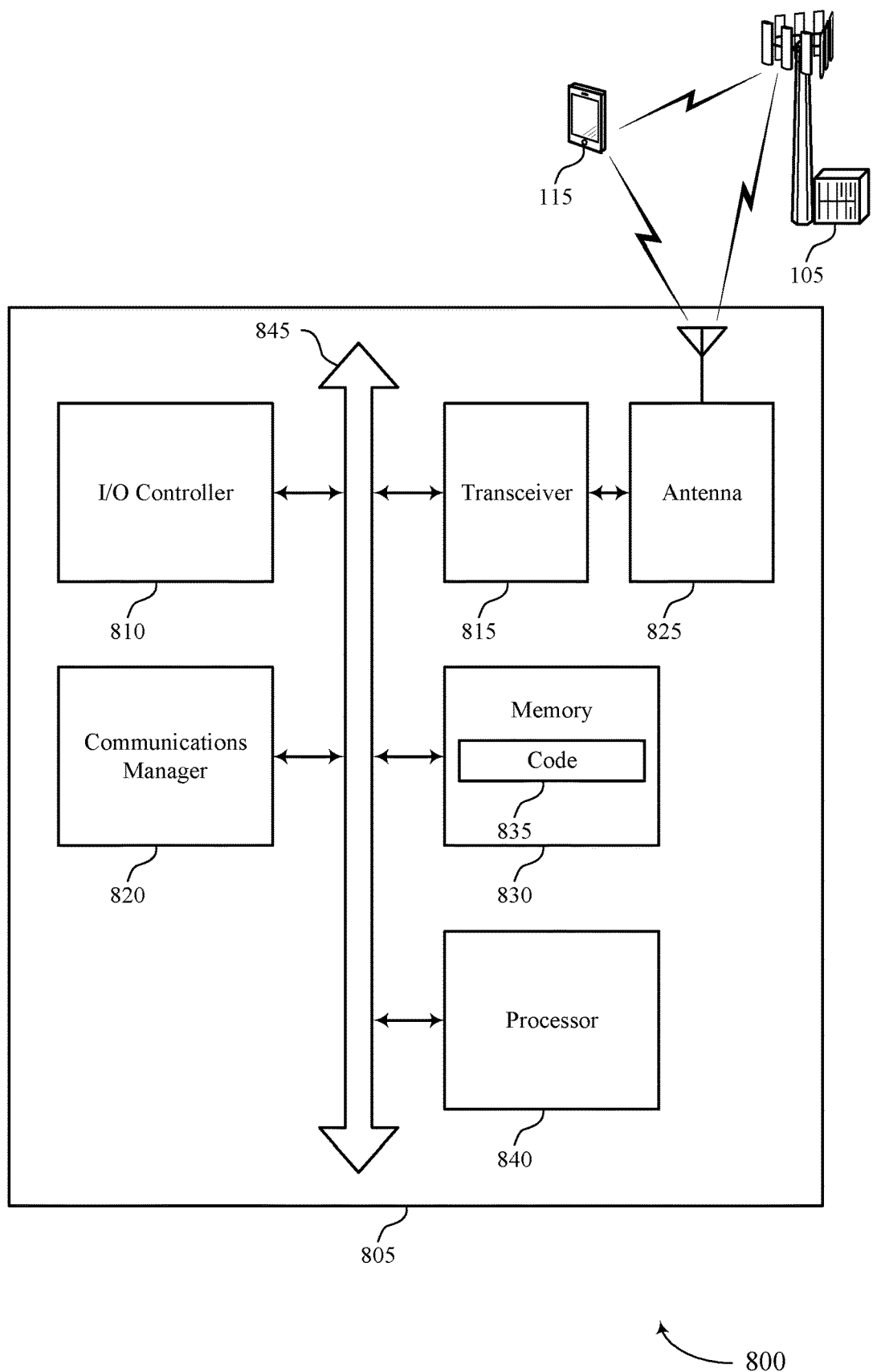
FIG. 8 shows a diagram of a system including a device that supports small data transmission techniques in wireless communications in accordance with one or more aspects of the present disclosure.

FIG. 8 shows a diagram of a system 800 including a device 805 that supports small data transmission techniques in wireless communications in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting small data transmission techniques in wireless communications). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for establishing a connection with a network entity for communications between the network entity and the UE. The communications manager 820 may be configured as or otherwise support a means for transitioning to an inactive state in which a security context associated with the connection between the network entity and the UE is maintained. The communications manager 820 may be configured as or otherwise support a means for determining, based on a presence of data for transmission via the connection while in the inactive state, that one or more parameters associated with the connection meet a threshold criteria. The communications manager 820 may be configured as or otherwise support a means for transmitting the data via the connection while in the inactive state based on the one or more parameters meeting the threshold criteria.

Additionally, or alternatively, the communications manager 820 may support wireless communication at a UE in accordance with examples as disclosed herein. For example, the communications manager 820 may be configured as or otherwise support a means for receiving configuration information for a set of periodic resources for transmission of data via a connection between the UE and a first cell while the connection is in an inactive state. The communications manager 820 may be configured as or otherwise support a means for transitioning the connection from an active state to the inactive state. The communications manager 820 may be configured as or otherwise support a means for determining, while in the inactive state, that a trigger is present for a priority-based cell reselection from the first cell to a second cell that has priority over the first cell. The communications manager 820 may be configured as or otherwise support a means for maintaining the connection with the first cell, irrespective of the trigger for the priority-based cell reselection, based on one or more parameters associated with the connection with the first cell meeting a threshold criteria.

By including or configuring the communications manager 820 in accordance with examples as described herein, the device 805 may support techniques that allow a UE to remain in an inactive state in some cases where the UE would otherwise transition to an idle state. Such techniques may provide power savings due to reduced connection establishment or reestablishment communications, enhanced resource utilization through reduced overhead, and reduced latency due to fewer interruptions in communications when a UE is in an inactive state. Overall network efficiency, latency, reliability, and user experience thus may be enhanced.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of small data transmission techniques in wireless communications as described herein, or the processor 840 and the memory 830 may be otherwise configured to perform or support such operations.

Figure 9:
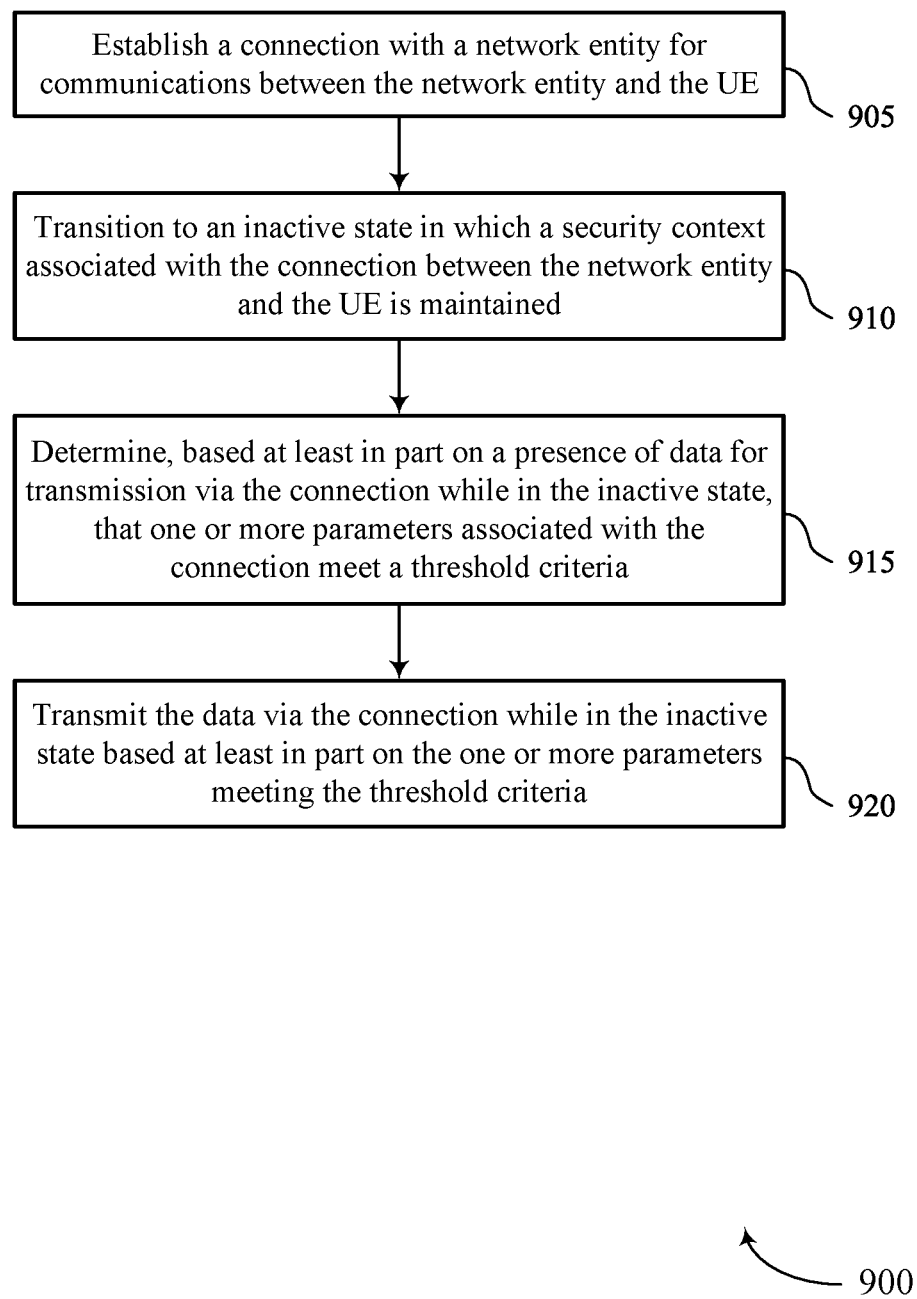
FIGS. 9 through 18 show flowcharts illustrating methods that support small data transmission techniques in wireless communications in accordance with one or more aspects of the present disclosure.

FIG. 9 shows a flowchart illustrating a method 900 that supports small data transmission techniques in wireless communications in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include establishing a connection with a network entity for communications between the network entity and the UE. The operations of 905 may be performed in accordance with examples as disclosed herein. In some examples, aspects of the operations of 905 may be performed by a connection manager 725 as described with reference to FIG. 7.

At 910, the method may include transitioning to an inactive state in which a security context associated with the connection between the network entity and the UE is maintained. The operations of 910 may be performed in accordance with examples as disclosed herein. In some examples, aspects of the operations of 910 may be performed by an inactive state manager 730 as described with reference to FIG. 7.

At 915, the method may include determining, based on a presence of data for transmission via the connection while in the inactive state, that one or more parameters associated with the connection meet a threshold criteria. The operations of 915 may be performed in accordance with examples as disclosed herein. In some examples, aspects of the operations of 915 may be performed by an SDT manager 735 as described with reference to FIG. 7.

At 920, the method may include transmitting the data via the connection while in the inactive state based on the one or more parameters meeting the threshold criteria. The operations of 920 may be performed in accordance with examples as disclosed herein. In some examples, aspects of the operations of 920 may be performed by an SDT manager 735 as described with reference to FIG. 7.

Figure 10:
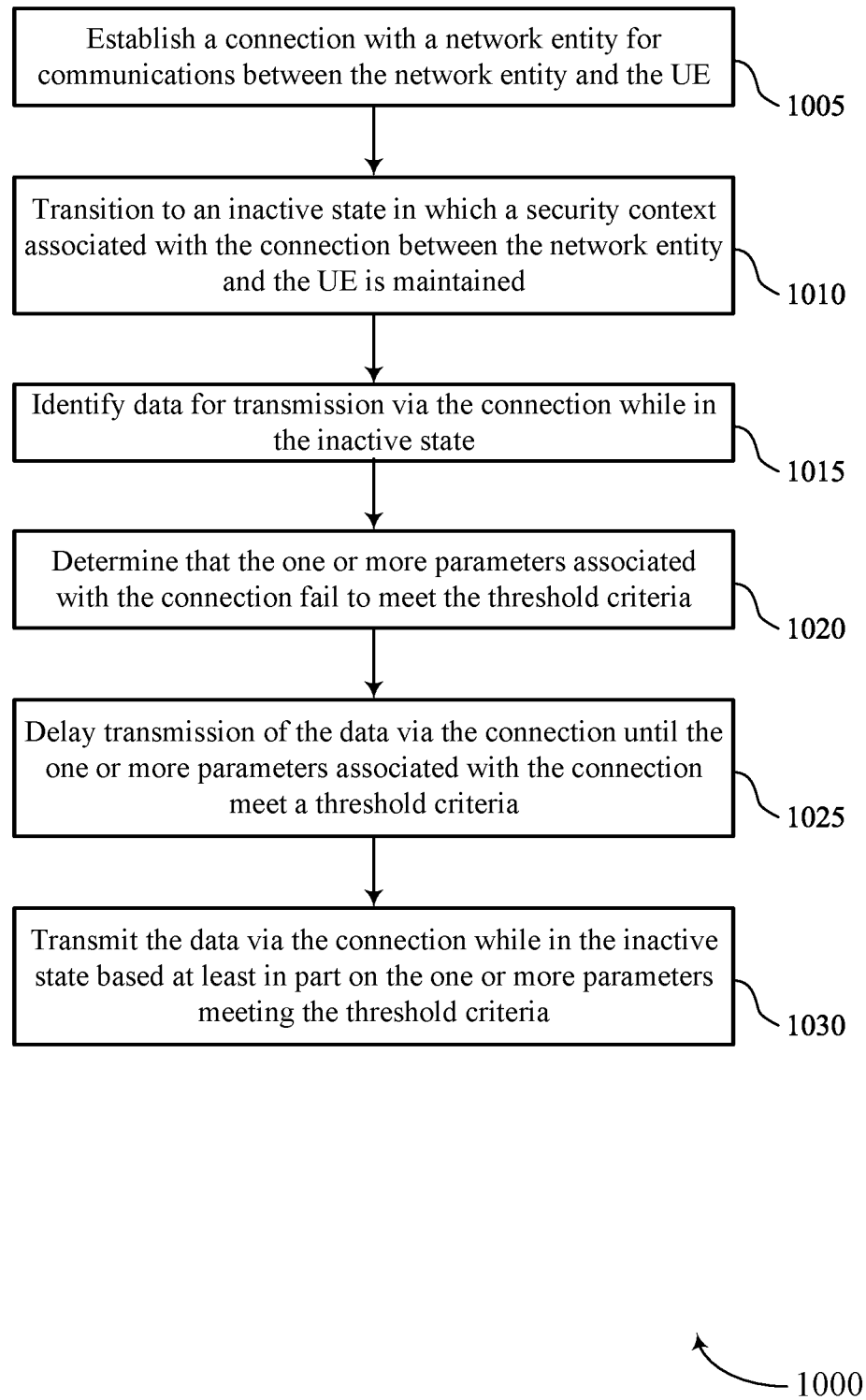

FIG. 10 shows a flowchart illustrating a method 1000 that supports small data transmission techniques in wireless communications in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include establishing a connection with a network entity for communications between the network entity and the UE. The operations of 1005 may be performed in accordance with examples as disclosed herein. In some examples, aspects of the operations of 1005 may be performed by a connection manager 725 as described with reference to FIG. 7.

At 1010, the method may include transitioning to an inactive state in which a security context associated with the connection between the network entity and the UE is maintained. The operations of 1010 may be performed in accordance with examples as disclosed herein. In some examples, aspects of the operations of 1010 may be performed by an inactive state manager 730 as described with reference to FIG. 7.

At 1015, the method may include identifying data for transmission via the connection while in the inactive state. The operations of 1015 may be performed in accordance with examples as disclosed herein. In some examples, aspects of the operations of 1015 may be performed by an SDT manager 735 as described with reference to FIG. 7.

At 1020, the method may include determining that the one or more parameters associated with the connection fail to meet the threshold criteria. The operations of 1020 may be performed in accordance with examples as disclosed herein. In some examples, aspects of the operations of 1020 may be performed by an SDT manager 735 as described with reference to FIG. 7.

At 1025, the method may include delaying transmission of the data via the connection until the one or more parameters associated with the connection meet a threshold criteria. The operations of 1025 may be performed in accordance with examples as disclosed herein. In some examples, aspects of the operations of 1025 may be performed by an SDT manager 735 as described with reference to FIG. 7.

At 1030, the method may include transmitting the data via the connection while in the inactive state based on the one or more parameters meeting the threshold criteria. The operations of 1030 may be performed in accordance with examples as disclosed herein. In some examples, aspects of the operations of 1030 may be performed by an SDT manager 735 as described with reference to FIG. 7.

Figure 11:
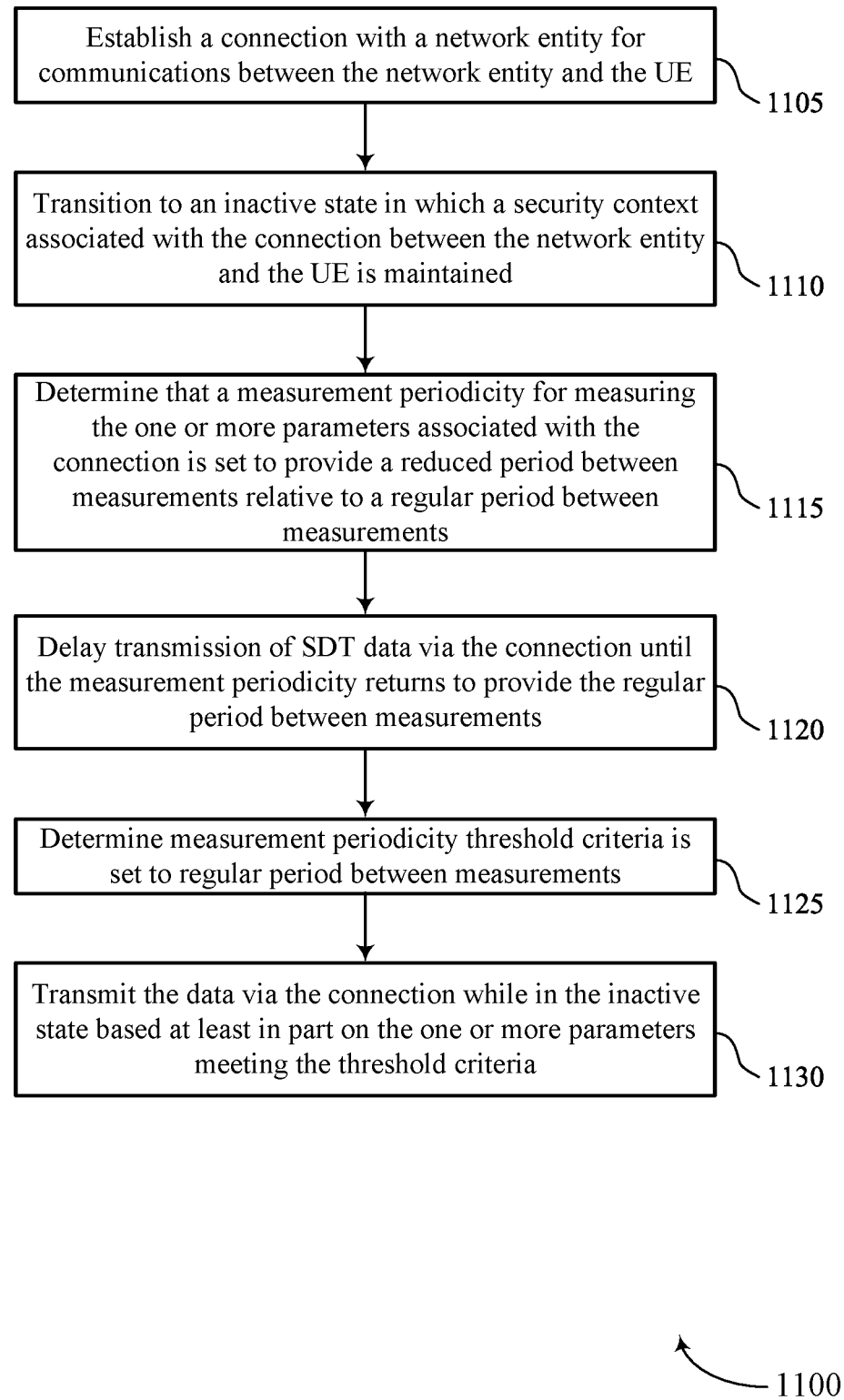

FIG. 11 shows a flowchart illustrating a method 1100 that supports small data transmission techniques in wireless communications in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include establishing a connection with a network entity for communications between the network entity and the UE. The operations of 1105 may be performed in accordance with examples as disclosed herein. In some examples, aspects of the operations of 1105 may be performed by a connection manager 725 as described with reference to FIG. 7.

At 1110, the method may include transitioning to an inactive state in which a security context associated with the connection between the network entity and the UE is maintained. The operations of 1110 may be performed in accordance with examples as disclosed herein. In some examples, aspects of the operations of 1110 may be performed by an inactive state manager 730 as described with reference to FIG. 7.

At 1115, the method may include determining that a measurement periodicity for measuring the one or more parameters associated with the connection is set to provide a reduced period between measurements relative to a regular period between measurements. The operations of 1115 may be performed in accordance with examples as disclosed herein. In some examples, aspects of the operations of 1115 may be performed by a measurement periodicity manager 750 as described with reference to FIG. 7.

At 1120, the method may include delaying transmission of SDT data via the connection until the measurement periodicity returns to provide the regular period between measurements. The operations of 1120 may be performed in accordance with examples as disclosed herein. In some examples, aspects of the operations of 1120 may be performed by a measurement periodicity manager 750 as described with reference to FIG. 7.

At 1125, the method may include determining that the measurement periodicity threshold criteria is set to regular period between measurements. The operations of 1125 may be performed in accordance with examples as disclosed herein. In some examples, aspects of the operations of 1125 may be performed by an SDT manager 735 as described with reference to FIG. 7.

At 1130, the method may include transmitting the data via the connection while in the inactive state based on the one or more parameters meeting the threshold criteria. The operations of 1130 may be performed in accordance with examples as disclosed herein. In some examples, aspects of the operations of 1130 may be performed by an SDT manager 735 as described with reference to FIG. 7.

Figure 12:
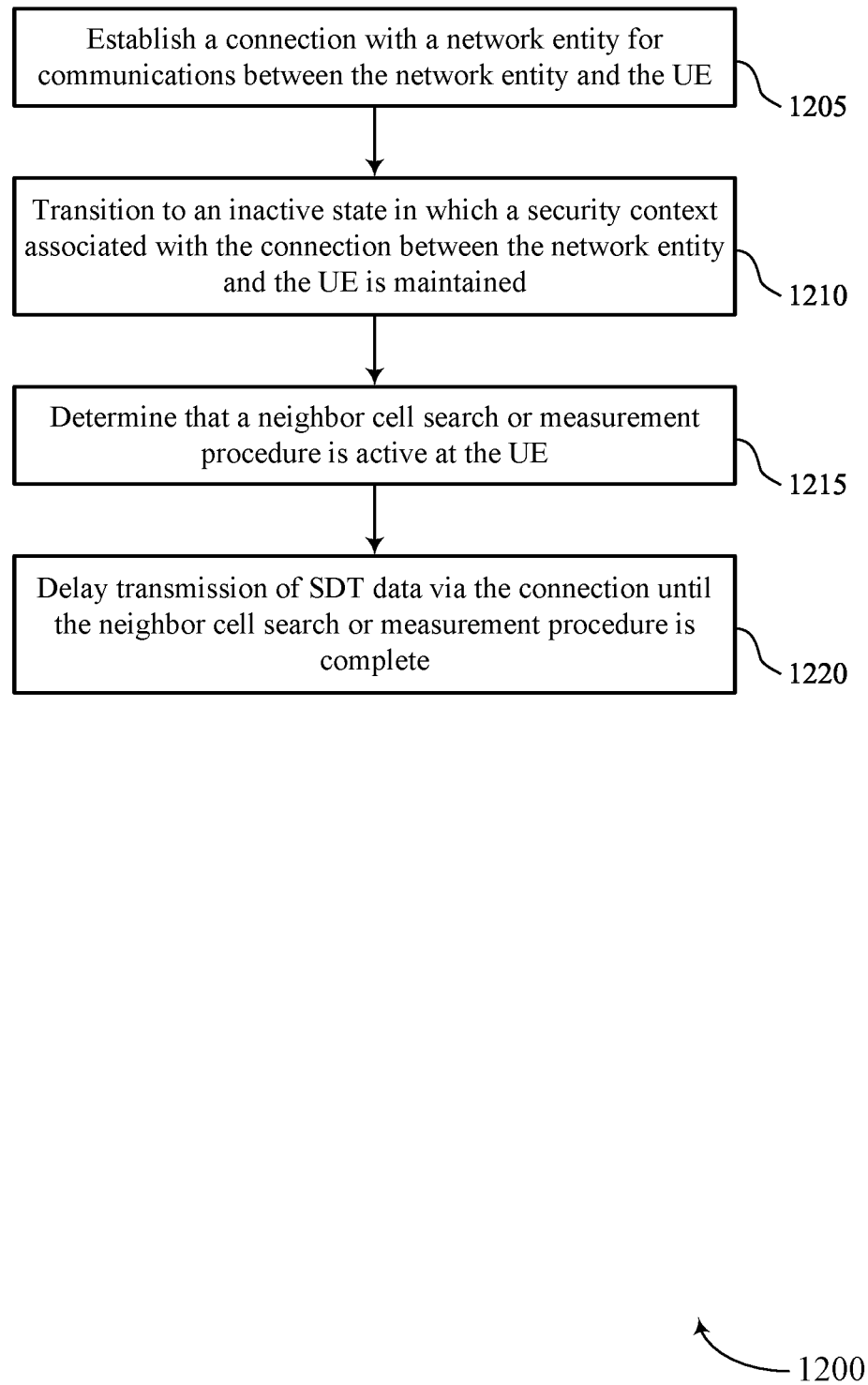

FIG. 12 shows a flowchart illustrating a method 1200 that supports small data transmission techniques in wireless communications in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include establishing a connection with a network entity for communications between the network entity and the UE. The operations of 1205 may be performed in accordance with examples as disclosed herein. In some examples, aspects of the operations of 1205 may be performed by a connection manager 725 as described with reference to FIG. 7.

At 1210, the method may include transitioning to an inactive state in which a security context associated with the connection between the network entity and the UE is maintained. The operations of 1210 may be performed in accordance with examples as disclosed herein. In some examples, aspects of the operations of 1210 may be performed by an inactive state manager 730 as described with reference to FIG. 7.

At 1215, the method may include determining that a neighbor cell search or measurement procedure is active at the UE. The operations of 1215 may be performed in accordance with examples as disclosed herein. In some examples, aspects of the operations of 1215 may be performed by a cell reselection manager 745 as described with reference to FIG. 7.

At 1220, the method may include delaying transmission of SDT data via the connection until the neighbor cell search or measurement procedure is complete. The operations of 1220 may be performed in accordance with examples as disclosed herein. In some examples, aspects of the operations of 1220 may be performed by a cell reselection manager 745 as described with reference to FIG. 7.

Figure 13:
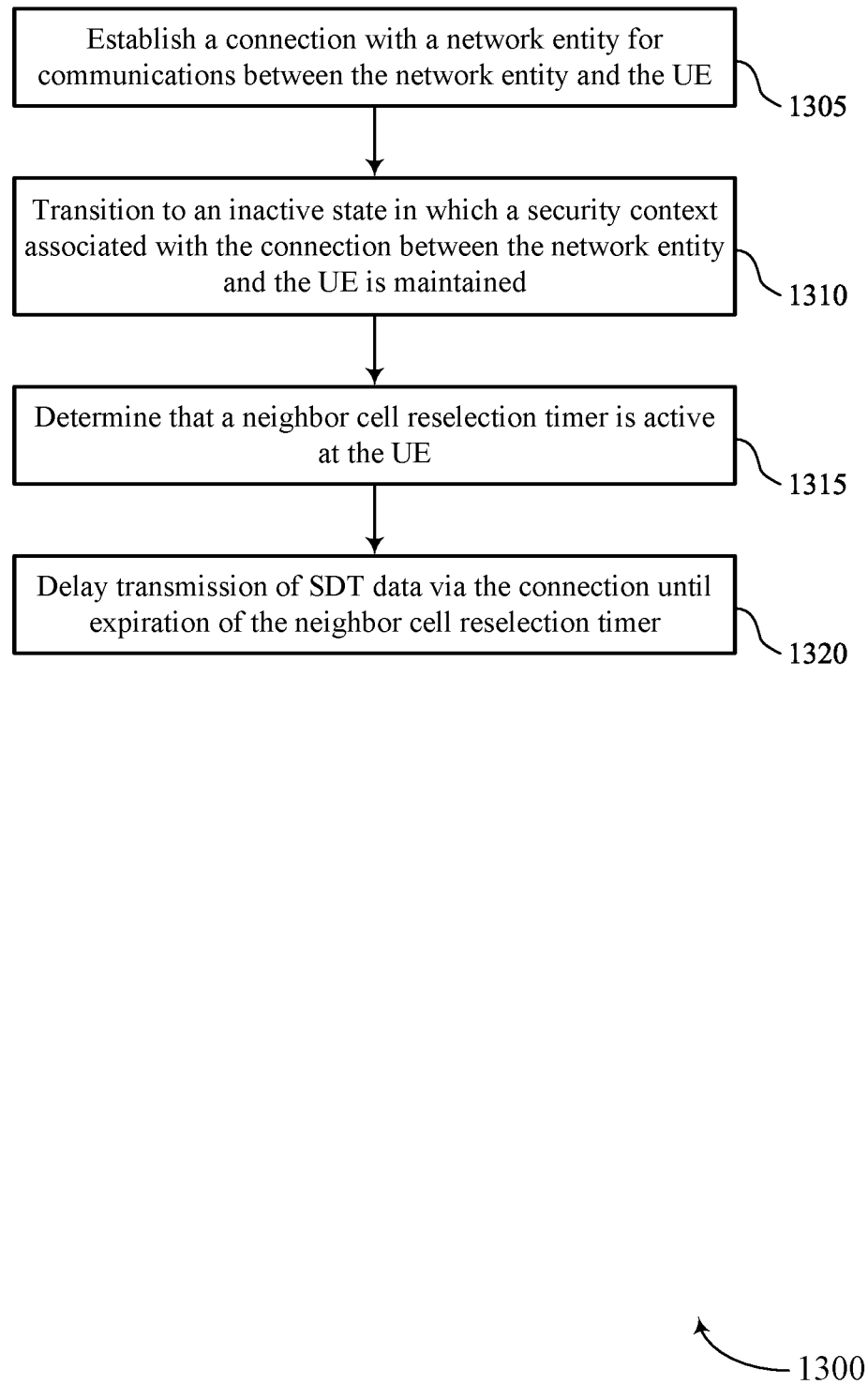

FIG. 13 shows a flowchart illustrating a method 1300 that supports small data transmission techniques in wireless communications in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include establishing a connection with a network entity for communications between the network entity and the UE. The operations of 1305 may be performed in accordance with examples as disclosed herein. In some examples, aspects of the operations of 1305 may be performed by a connection manager 725 as described with reference to FIG. 7.

At 1310, the method may include transitioning to an inactive state in which a security context associated with the connection between the network entity and the UE is maintained. The operations of 1310 may be performed in accordance with examples as disclosed herein. In some examples, aspects of the operations of 1310 may be performed by an inactive state manager 730 as described with reference to FIG. 7.

At 1315, the method may include determining that a neighbor cell reselection timer is active at the UE. The operations of 1315 may be performed in accordance with examples as disclosed herein. In some examples, aspects of the operations of 1315 may be performed by a cell reselection manager 745 as described with reference to FIG. 7.

At 1320, the method may include delaying transmission of SDT data via the connection until expiration of the neighbor cell reselection timer. The operations of 1320 may be performed in accordance with examples as disclosed herein. In some examples, aspects of the operations of 1320 may be performed by a cell reselection manager 745 as described with reference to FIG. 7.

Figure 14:
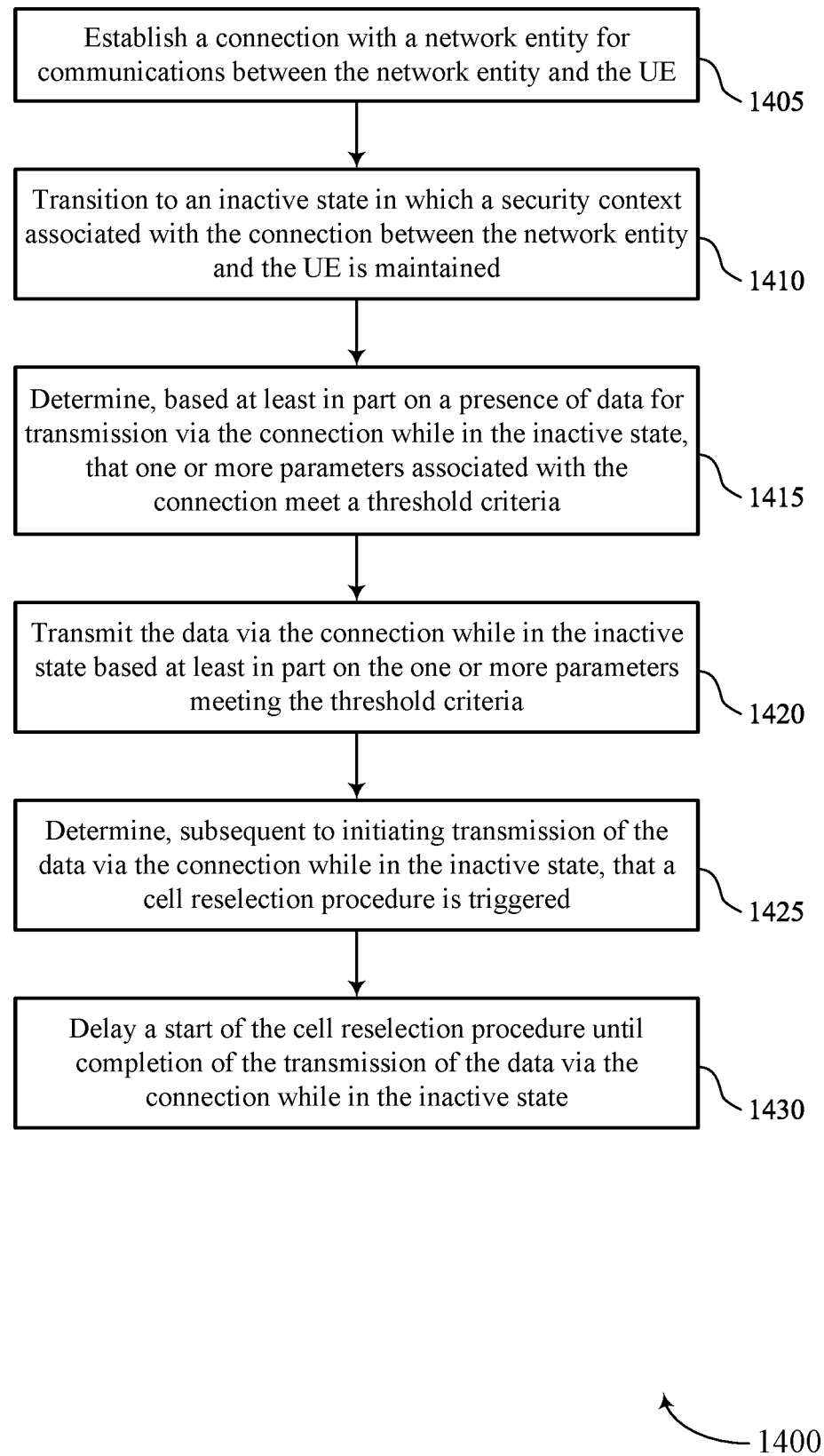

FIG. 14 shows a flowchart illustrating a method 1400 that supports small data transmission techniques in wireless communications in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include establishing a connection with a network entity for communications between the network entity and the UE. The operations of 1405 may be performed in accordance with examples as disclosed herein. In some examples, aspects of the operations of 1405 may be performed by a connection manager 725 as described with reference to FIG. 7.

At 1410, the method may include transitioning to an inactive state in which a security context associated with the connection between the network entity and the UE is maintained. The operations of 1410 may be performed in accordance with examples as disclosed herein. In some examples, aspects of the operations of 1410 may be performed by an inactive state manager 730 as described with reference to FIG. 7.

At 1415, the method may include determining, based on a presence of data for transmission via the connection while in the inactive state, that one or more parameters associated with the connection meet a threshold criteria. The operations of 1415 may be performed in accordance with examples as disclosed herein. In some examples, aspects of the operations of 1415 may be performed by an SDT manager 735 as described with reference to FIG. 7.

At 1420, the method may include transmitting the data via the connection while in the inactive state based on the one or more parameters meeting the threshold criteria. The operations of 1420 may be performed in accordance with examples as disclosed herein. In some examples, aspects of the operations of 1420 may be performed by an SDT manager 735 as described with reference to FIG. 7.

At 1425, the method may include determining, subsequent to initiating transmission of the data via the connection while in the inactive state, that a cell reselection procedure is triggered. The operations of 1425 may be performed in accordance with examples as disclosed herein. In some examples, aspects of the operations of 1425 may be performed by a cell reselection manager 745 as described with reference to FIG. 7.

At 1430, the method may include delaying a start of the cell reselection procedure until completion of the transmission of the data via the connection while in the inactive state. The operations of 1430 may be performed in accordance with examples as disclosed herein. In some examples, aspects of the operations of 1430 may be performed by a cell reselection manager 745 as described with reference to FIG. 7.

Figure 15:
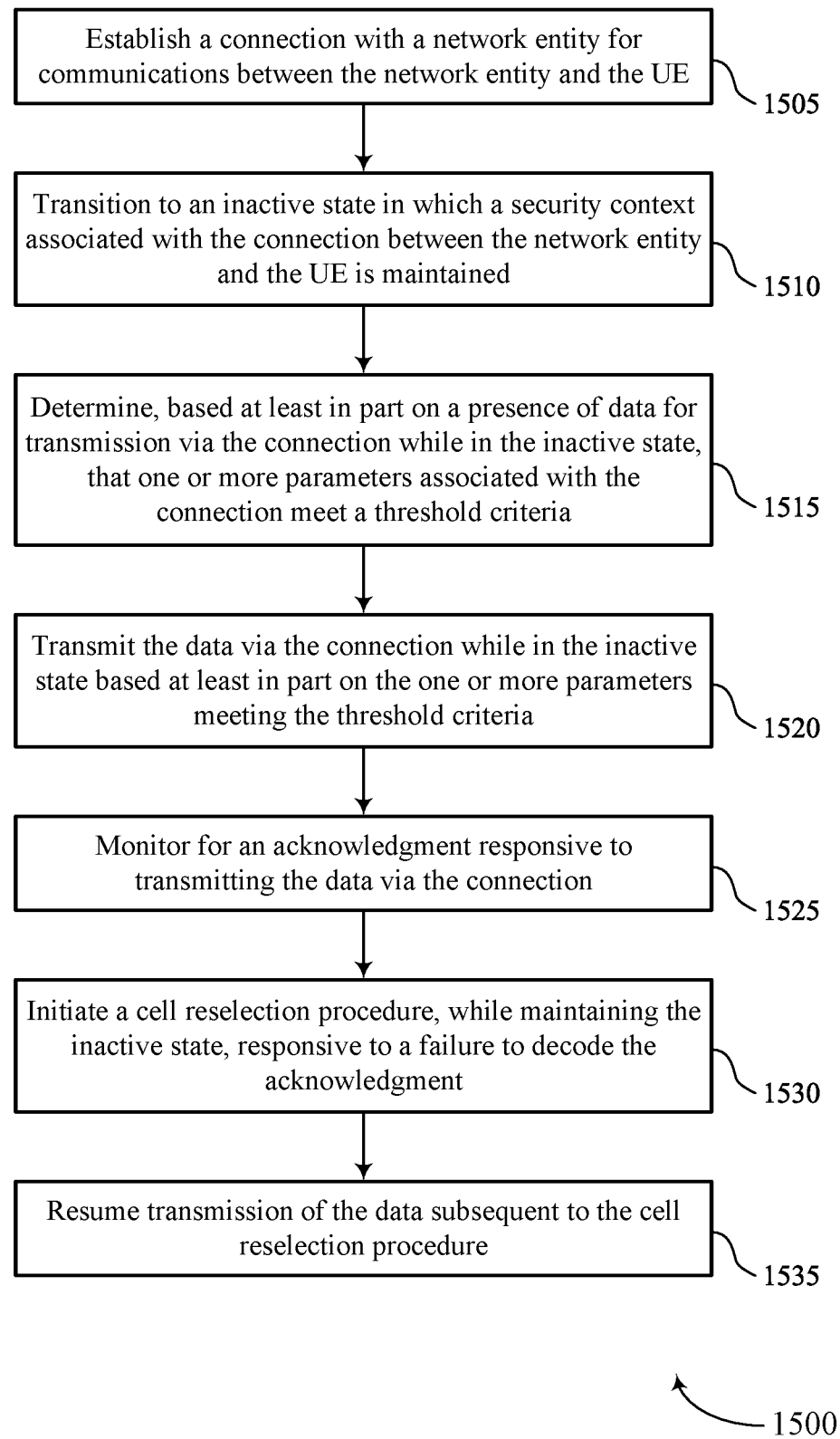

FIG. 15 shows a flowchart illustrating a method 1500 that supports small data transmission techniques in wireless communications in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include establishing a connection with a network entity for communications between the network entity and the UE. The operations of 1505 may be performed in accordance with examples as disclosed herein. In some examples, aspects of the operations of 1505 may be performed by a connection manager 725 as described with reference to FIG. 7.

At 1510, the method may include transitioning to an inactive state in which a security context associated with the connection between the network entity and the UE is maintained. The operations of 1510 may be performed in accordance with examples as disclosed herein. In some examples, aspects of the operations of 1510 may be performed by an inactive state manager 730 as described with reference to FIG. 7.

At 1515, the method may include determining, based on a presence of data for transmission via the connection while in the inactive state, that one or more parameters associated with the connection meet a threshold criteria. The operations of 1515 may be performed in accordance with examples as disclosed herein. In some examples, aspects of the operations of 1515 may be performed by an SDT manager 735 as described with reference to FIG. 7.

At 1520, the method may include transmitting the data via the connection while in the inactive state based on the one or more parameters meeting the threshold criteria. The operations of 1520 may be performed in accordance with examples as disclosed herein. In some examples, aspects of the operations of 1520 may be performed by an SDT manager 735 as described with reference to FIG. 7.

At 1525, the method may include monitoring for an acknowledgment responsive to transmitting the data via the connection. The operations of 1525 may be performed in accordance with examples as disclosed herein. In some examples, aspects of the operations of 1525 may be performed by a cell reselection manager 745 as described with reference to FIG. 7.

At 1530, the method may include initiating a cell reselection procedure, while maintaining the inactive state, responsive to a failure to decode the acknowledgment. The operations of 1530 may be performed in accordance with examples as disclosed herein. In some examples, aspects of the operations of 1530 may be performed by a cell reselection manager 745 as described with reference to FIG. 7.

At 1535, the method may include resuming transmission of the data subsequent to the cell reselection procedure. The operations of 1535 may be performed in accordance with examples as disclosed herein. In some examples, aspects of the operations of 1535 may be performed by an SDT manager 735 as described with reference to FIG. 7.

Figure 16:
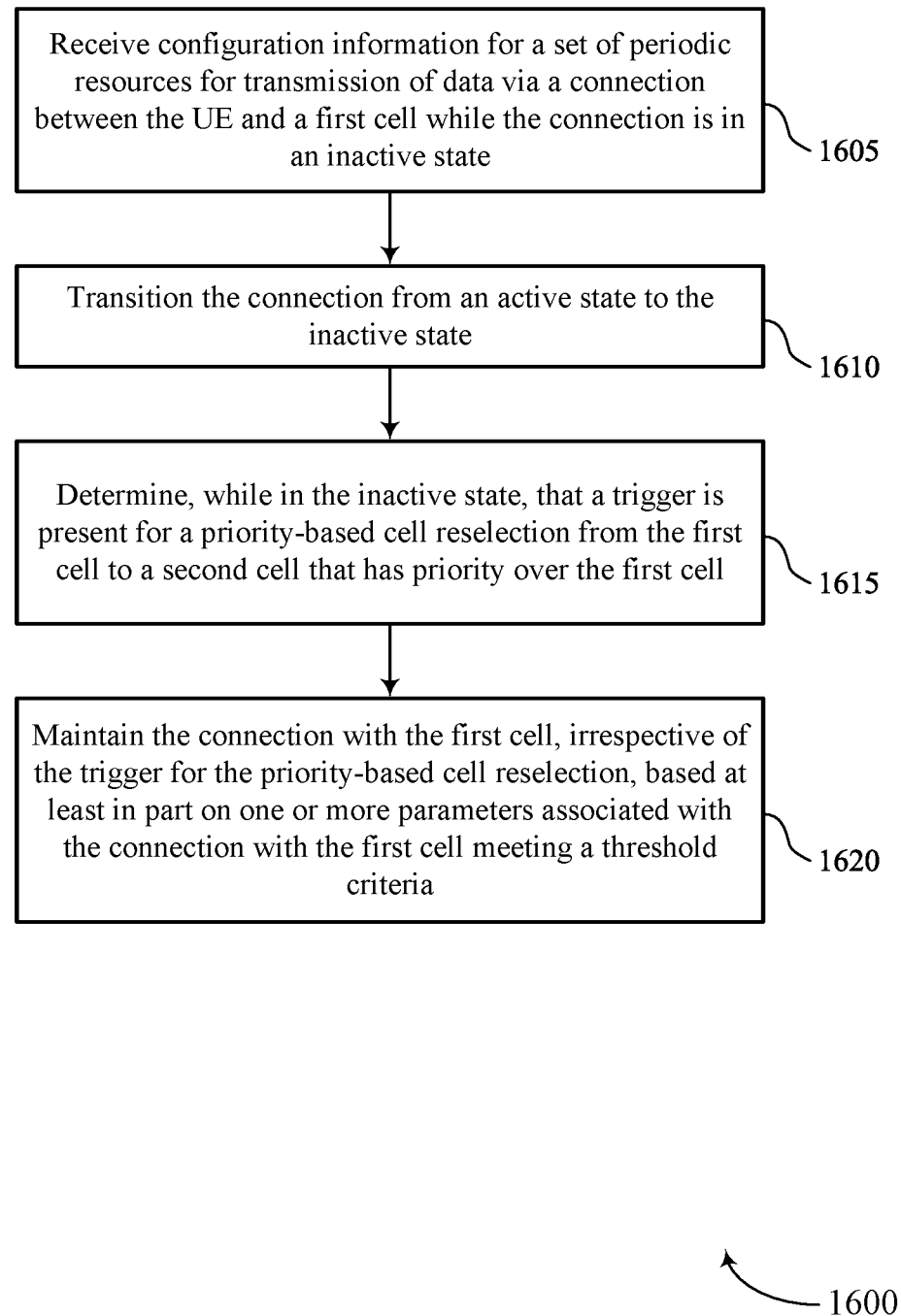

FIG. 16 shows a flowchart illustrating a method 1600 that supports small data transmission techniques in wireless communications in accordance with one or more aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving configuration information for a set of periodic resources for transmission of data via a connection between the UE and a first cell while the connection is in an inactive state. The operations of 1605 may be performed in accordance with examples as disclosed herein. In some examples, aspects of the operations of 1605 may be performed by a configured grant manager 740 as described with reference to FIG. 7.

At 1610, the method may include transitioning the connection from an active state to the inactive state. The operations of 1610 may be performed in accordance with examples as disclosed herein. In some examples, aspects of the operations of 1610 may be performed by an inactive state manager 730 as described with reference to FIG. 7.

At 1615, the method may include determining, while in the inactive state, that a trigger is present for a priority-based cell reselection from the first cell to a second cell that has priority over the first cell. The operations of 1615 may be performed in accordance with examples as disclosed herein. In some examples, aspects of the operations of 1615 may be performed by a cell reselection manager 745 as described with reference to FIG. 7.

At 1620, the method may include maintaining the connection with the first cell, irrespective of the trigger for the priority-based cell reselection, based on one or more parameters associated with the connection with the first cell meeting a threshold criteria. The operations of 1620 may be performed in accordance with examples as disclosed herein. In some examples, aspects of the operations of 1620 may be performed by a cell reselection manager 745 as described with reference to FIG. 7.

Figure 17:
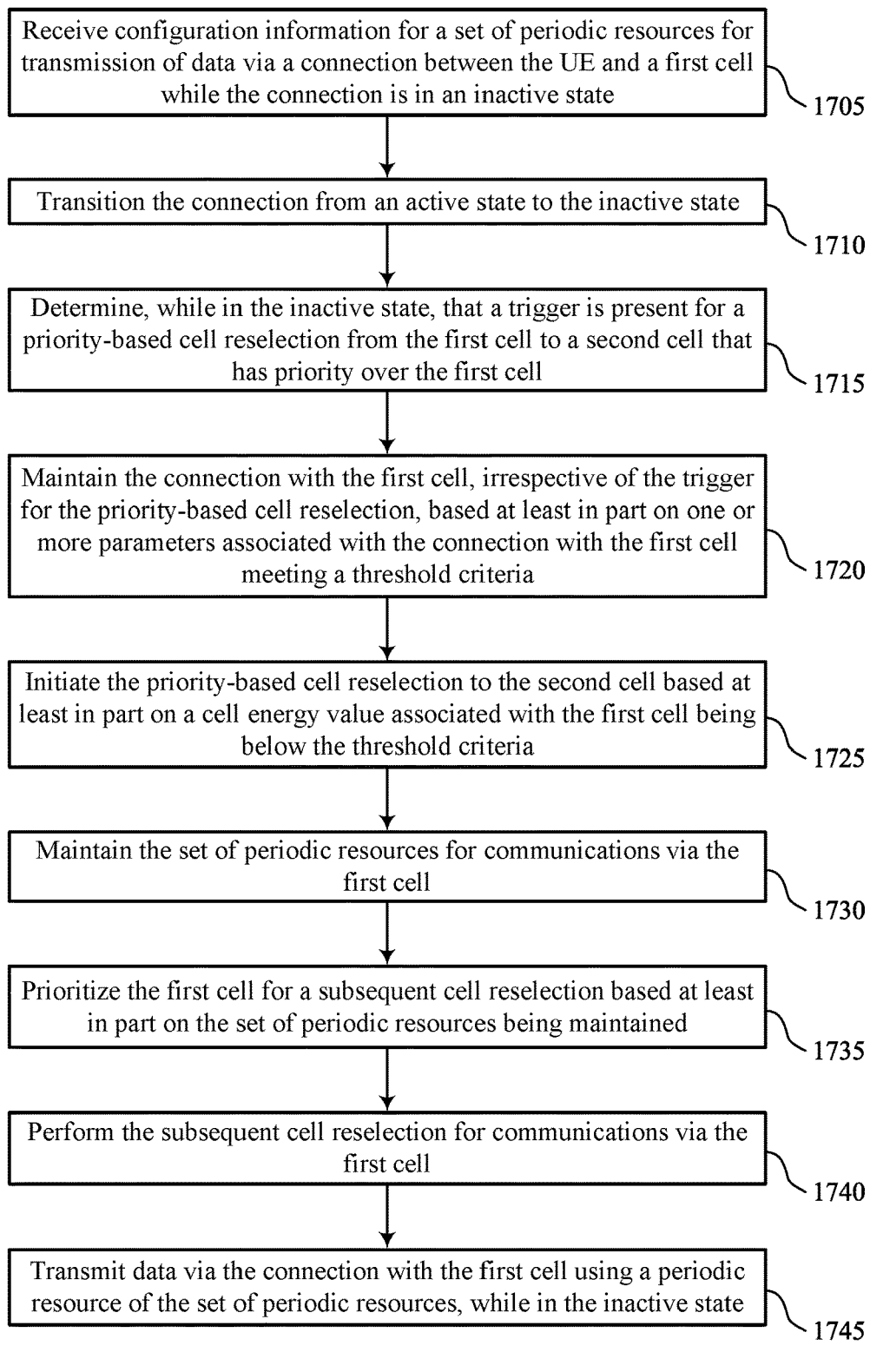

FIG. 17 shows a flowchart illustrating a method 1700 that supports small data transmission techniques in wireless communications in accordance with one or more aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1705, the method may include receiving configuration information for a set of periodic resources for transmission of data via a connection between the UE and a first cell while the connection is in an inactive state. The operations of 1705 may be performed in accordance with examples as disclosed herein. In some examples, aspects of the operations of 1705 may be performed by a configured grant manager 740 as described with reference to FIG. 7.

At 1710, the method may include transitioning the connection from an active state to the inactive state. The operations of 1710 may be performed in accordance with examples as disclosed herein. In some examples, aspects of the operations of 1710 may be performed by an inactive state manager 730 as described with reference to FIG. 7.

At 1715, the method may include determining, while in the inactive state, that a trigger is present for a priority-based cell reselection from the first cell to a second cell that has priority over the first cell. The operations of 1715 may be performed in accordance with examples as disclosed herein.

In some examples, aspects of the operations of 1715 may be performed by a cell reselection manager 745 as described with reference to FIG. 7.

At 1720, the method may include maintaining the connection with the first cell, irrespective of the trigger for the priority-based cell reselection, based on one or more parameters associated with the connection with the first cell meeting a threshold criteria. The operations of 1720 may be performed in accordance with examples as disclosed herein. In some examples, aspects of the operations of 1720 may be performed by a cell reselection manager 745 as described with reference to FIG. 7.

At 1725, the method may include initiating the priority-based cell reselection to the second cell based on a cell energy value associated with the first cell being below the threshold criteria. The operations of 1725 may be performed in accordance with examples as disclosed herein. In some examples, aspects of the operations of 1725 may be performed by a cell reselection manager 745 as described with reference to FIG. 7.

At 1730, the method may include maintaining the set of periodic resources for communications via the first cell. The operations of 1730 may be performed in accordance with examples as disclosed herein. In some examples, aspects of the operations of 1730 may be performed by a configured grant manager 740 as described with reference to FIG. 7.

At 1735, the method may include prioritizing the first cell for a subsequent cell reselection based on the set of periodic resources being maintained. The operations of 1735 may be performed in accordance with examples as disclosed herein. In some examples, aspects of the operations of 1735 may be performed by a configured grant manager 740 as described with reference to FIG. 7.

At 1740, the method may include performing the subsequent cell reselection for communications via the first cell. The operations of 1740 may be performed in accordance with examples as disclosed herein. In some examples, aspects of the operations of 1740 may be performed by a cell reselection manager 745 as described with reference to FIG. 7.

At 1745, the method may include transmitting data via the connection with the first cell using a periodic resource of the set of periodic resources, while in the inactive state. The operations of 1745 may be performed in accordance with examples as disclosed herein. In some examples, aspects of the operations of 1745 may be performed by an SDT manager 735 as described with reference to FIG. 7.

Figure 18:
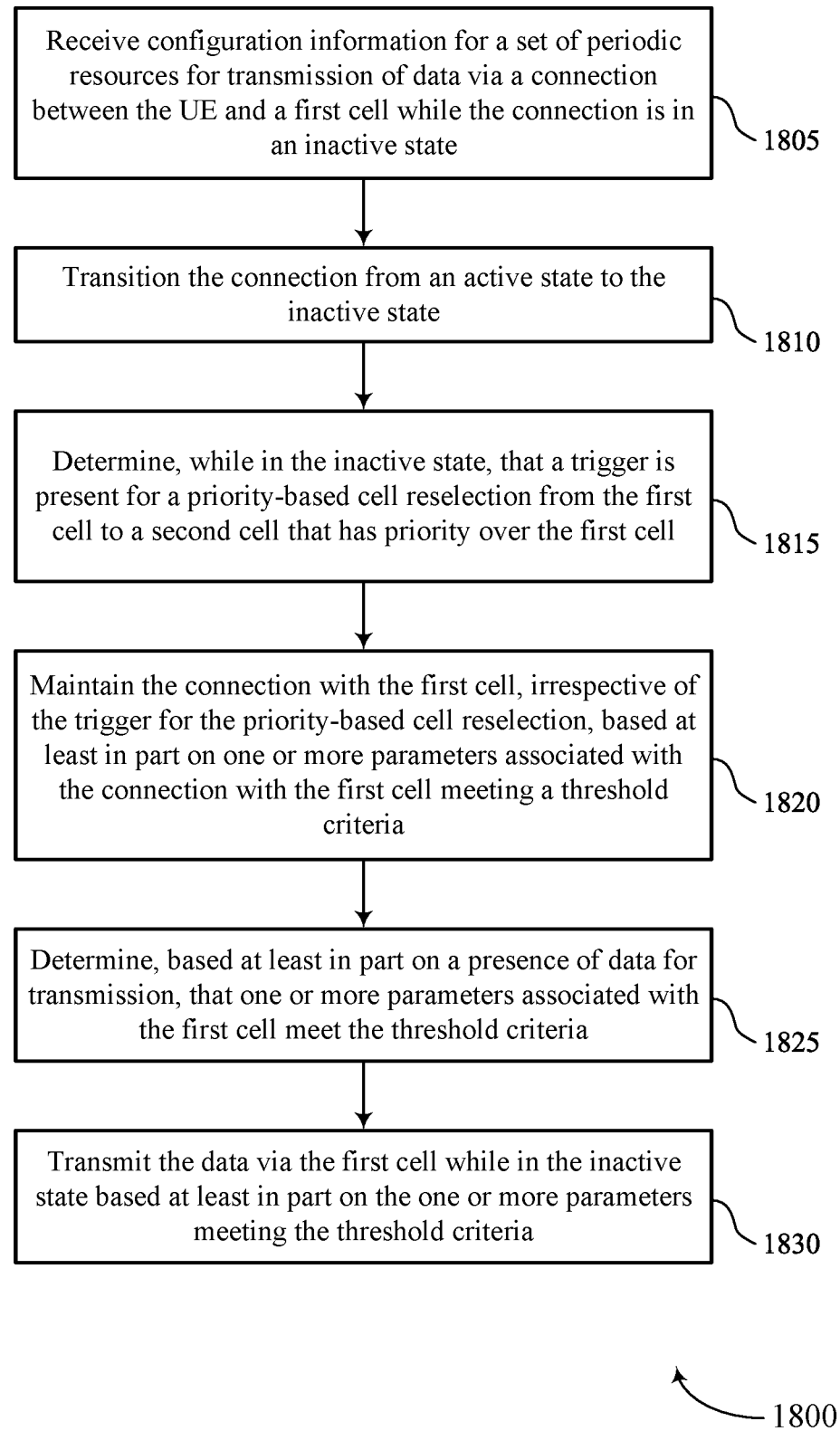

FIG. 18 shows a flowchart illustrating a method 1800 that supports small data transmission techniques in wireless communications in accordance with one or more aspects of the present disclosure. The operations of the method 1800 may be implemented by a UE or its components as described herein. For example, the operations of the method 1800 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1805, the method may include receiving configuration information for a set of periodic resources for transmission of data via a connection between the UE and a first cell while the connection is in an inactive state. The operations of 1805 may be performed in accordance with examples as disclosed herein. In some examples, aspects of the operations of 1805 may be performed by a configured grant manager 740 as described with reference to FIG. 7.

At 1810, the method may include transitioning the connection from an active state to the inactive state. The operations of 1810 may be performed in accordance with examples as disclosed herein. In some examples, aspects of the operations of 1810 may be performed by an inactive state manager 730 as described with reference to FIG. 7.

At 1815, the method may include determining, while in the inactive state, that a trigger is present for a priority-based cell reselection from the first cell to a second cell that has priority over the first cell. The operations of 1815 may be performed in accordance with examples as disclosed herein. In some examples, aspects of the operations of 1815 may be performed by a cell reselection manager 745 as described with reference to FIG. 7.

At 1820, the method may include maintaining the connection with the first cell, irrespective of the trigger for the priority-based cell reselection, based on one or more parameters associated with the connection with the first cell meeting a threshold criteria. The operations of 1820 may be performed in accordance with examples as disclosed herein. In some examples, aspects of the operations of 1820 may be performed by a cell reselection manager 745 as described with reference to FIG. 7.

At 1825, the method may include determining, based on a presence of data for transmission, that one or more parameters associated with the first cell meet the threshold criteria. The operations of 1825 may be performed in accordance with examples as disclosed herein. In some examples, aspects of the operations of 1825 may be performed by an SDT manager 735 as described with reference to FIG. 7.

At 1830, the method may include transmitting the data via the first cell while in the inactive state based on the one or more parameters meeting the threshold criteria. The operations of 1830 may be performed in accordance with examples as disclosed herein. In some examples, aspects of the operations of 1830 may be performed by an SDT manager 735 as described with reference to FIG. 7.

The following provides an overview of aspects of the present disclosure:

Aspect 1: A method for wireless communication at a UE, comprising: establishing a connection with a network entity for communications between the network entity and the UE; transitioning to an inactive state in which a security context associated with the connection between the network entity and the UE is maintained; determining, based at least in part on a presence of data for transmission via the connection while in the inactive state, that one or more parameters associated with the connection meet a threshold criteria; and transmitting the data via the connection while in the inactive state based at least in part on the one or more parameters meeting the threshold criteria.

Aspect 2: The method of aspect 1, further comprising: determining that the one or more parameters associated with the connection fail to meet the threshold criteria; and delaying transmission of the data via the connection until the one or more parameters associated with the connection meet the threshold criteria.

Aspect 3: The method of any of aspects 1 through 2, wherein the one or more parameters associated with the connection include a serving cell energy value.

Aspect 4: The method of any of aspects 1 through 3, further comprising: determining that a measurement periodicity for measuring the one or more parameters associated with the connection is set to provide a reduced period between measurements relative to a regular period between measurements; and delaying transmission of the data via the connection until the measurement periodicity returns to provide the regular period between measurements.

Aspect 5: The method of any of aspects 1 through 4, further comprising: determining that a neighbor cell search or measurement procedure is active at the UE; and delaying transmission of the data via the connection until the neighbor cell search or measurement procedure is complete.

Aspect 6: The method of any of aspects 1 through 5, further comprising: determining that a neighbor cell reselection timer is active at the UE; and delaying transmission of the data via the connection until expiration of the neighbor cell reselection timer.

Aspect 7: The method of any of aspects 1 through 6, further comprising: determining, subsequent to initiating transmission of the data via the connection while in the inactive state, that a cell reselection procedure is triggered; and delaying a start of the cell reselection procedure until completion of the transmission of the data via the connection while in the inactive state.

Aspect 8: The method of aspect 7, wherein a search or measurement periodicity for cell reselection is adjusted, based at least in part on an expected duration of the transmission of the data, to delay the start of the cell reselection procedure.

Aspect 9: The method of any of aspects 1 through 8, further comprising: monitoring for an acknowledgment responsive to transmitting the data via the connection; and initiating a cell reselection procedure, while maintaining the inactive state, responsive to a failure to decode the acknowledgment.

Aspect 10: The method of aspect 9, further comprising: resuming transmission of the data subsequent to the cell reselection procedure.

Aspect 11: The method of any of aspects 1 through 10, wherein an amount of the data for transmission via the connection while in the inactive state is less than a data threshold value for a small data transmission (SDT) for transmissions while in the inactive state.

Aspect 12: A method for wireless communication at a UE, comprising: receiving configuration information for a set of periodic resources for transmission of data via a connection between the UE and a first cell while the connection is in an inactive state; transitioning the connection from an active state to the inactive state; determining, while in the inactive state, that a trigger is present for a priority-based cell reselection from the first cell to a second cell that has priority over the first cell; and maintaining the connection with the first cell, irrespective of the trigger for the priority-based cell reselection, based at least in part on one or more parameters associated with the connection with the first cell meeting a threshold criteria.

Aspect 13: The method of aspect 12, wherein the connection with the first cell is maintained responsive to a cell energy value associated with the first cell meeting the threshold criteria.

Aspect 14: The method of any of aspects 12 through 13, further comprising: initiating the priority-based cell reselection to the second cell based at least in part on a cell energy value associated with the first cell being below the threshold criteria.

Aspect 15: The method of aspect 14, further comprising: maintaining the set of periodic resources for communications via the first cell; and prioritizing the first cell for a subsequent cell reselection based at least in part on the set of periodic resources being maintained.

Aspect 16: The method of aspect 15, further comprising: performing the subsequent cell reselection for communications via the first cell; and transmitting data via the connection with the first cell using a periodic resource of the set of periodic resources, while in the inactive state.

Aspect 17: The method of any of aspects 12 through 16, further comprising: determining, based at least in part on a presence of data for transmission, that one or more parameters associated with the first cell meet the threshold criteria; and transmitting the data via the first cell while in the inactive state based at least in part on the one or more parameters meeting the threshold criteria.

Aspect 18: An apparatus for wireless communication at a UE, comprising a processor; memory coupled with the processor; and instructions stored in the memory and executable by the processor to cause the apparatus to perform a method of any of aspects 1 through 11.

Aspect 19: An apparatus for wireless communication at a UE, comprising at least one means for performing a method of any of aspects 1 through 11.

Aspect 20: A non-transitory computer-readable medium storing code for wireless communication at a UE, the code comprising instructions executable by a processor to perform a method of any of aspects 1 through 11.

Aspect 21: An apparatus for wireless communication at a UE, comprising a processor; memory coupled with the processor; and instructions stored in the memory and executable by the processor to cause the apparatus to perform a method of any of aspects 12 through 17.

Aspect 22: An apparatus for wireless communication at a UE, comprising at least one means for performing a method of any of aspects 12 through 17.

Aspect 23: A non-transitory computer-readable medium storing code for wireless communication at a UE, the code comprising instructions executable by a processor to perform a method of any of aspects 12 through 17.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    establishing a connection with a network entity for communications between the network entity and the UE;
    transitioning to an inactive state in which a security context associated with the connection between the network entity and the UE is maintained;
    determining, based at least in part on a presence of data for transmission via the connection while in the inactive state, that one or more parameters associated with the connection meet a threshold criteria;
    transmitting the data via the connection while in the inactive state based at least in part on the one or more parameters meeting the threshold criteria;
    monitoring for an acknowledgment responsive to transmitting the data via the connection; and
    initiating a cell reselection procedure, while maintaining the inactive state, responsive to a failure to decode the acknowledgment.

2. The method of claim 1, further comprising:
determining that the one or more parameters associated with the connection fail to meet the threshold criteria; and
delaying transmission of the data via the connection until the one or more parameters associated with the connection meet the threshold criteria.

3. The method of claim 1, wherein the one or more parameters associated with the connection include a serving cell energy value.

4. The method of claim 1, further comprising:
determining that a measurement periodicity for measuring the one or more parameters associated with the connection is set to provide a reduced period between measurements relative to a regular period between measurements; and
delaying transmission of the data via the connection until the measurement periodicity returns to provide the regular period between measurements.

5. The method of claim 1, further comprising:
determining that a neighbor cell search or measurement procedure is active at the UE; and
delaying transmission of the data via the connection until the neighbor cell search or measurement procedure is complete.

6. The method of claim 1, further comprising:
determining that a neighbor cell reselection timer is active at the UE; and
delaying transmission of the data via the connection until expiration of the neighbor cell reselection timer.

7. The method of claim 1, further comprising:
determining, subsequent to initiating transmission of the data via the connection while in the inactive state, that a cell reselection procedure is triggered; and
delaying a start of the cell reselection procedure until completion of the transmission of the data via the connection while in the inactive state.

8. The method of claim 7, wherein a search or measurement periodicity for cell reselection is adjusted, based at least in part on an expected duration of the transmission of the data, to delay the start of the cell reselection procedure.

9. The method of claim 1, further comprising:
resuming transmission of the data subsequent to the cell reselection procedure.

10. The method of claim 1, wherein an amount of the data for transmission via the connection while in the inactive state is less than a data threshold value for a small data transmission (SDT) for transmissions while in the inactive state.

11. An apparatus for wireless communication at a user equipment (UE), comprising:
a processor;
memory coupled with the processor; and
instructions stored in the memory and executable by the processor to cause the apparatus to:
establish a connection with a network entity for communications between the network entity and the UE;
transition to an inactive state in which a security context associated with the connection between the network entity and the UE is maintained;
determine, based at least in part on a presence of data for transmission via the connection while in the inactive state, that one or more parameters associated with the connection meet a threshold criteria;
transmit the data via the connection while in the inactive state based at least in part on the one or more parameters meeting the threshold criteria;
monitor for an acknowledgment responsive to transmitting the data via the connection; and
initiate a cell reselection procedure, while maintaining the inactive state, responsive to a failure to decode the acknowledgment.

12. The apparatus of claim 11, wherein the instructions are further executable by the processor to cause the apparatus to:
determine that the one or more parameters associated with the connection fail to meet the threshold criteria; and
delay transmission of the data via the connection until the one or more parameters associated with the connection meet the threshold criteria.

13. The apparatus of claim 11, wherein the one or more parameters associated with the connection include a serving cell energy value.

14. The apparatus of claim 11, wherein the instructions are further executable by the processor to cause the apparatus to:
determine that a measurement periodicity for measuring the one or more parameters associated with the connection is set to provide a reduced period between measurements relative to a regular period between measurements; and
delay transmission of the data via the connection until the measurement periodicity returns to provide the regular period between measurements.

15. The apparatus of claim 11, wherein the instructions are further executable by the processor to cause the apparatus to:
determine that a neighbor cell search or measurement procedure is active at the UE; and
delay transmission of the data via the connection until the neighbor cell search or measurement procedure is complete.

16. The apparatus of claim 11, wherein the instructions are further executable by the processor to cause the apparatus to:
determine that a neighbor cell reselection timer is active at the UE; and
delay transmission of the data via the connection until expiration of the neighbor cell reselection timer.

17. The apparatus of claim 11, wherein the instructions are further executable by the processor to cause the apparatus to:
determine, subsequent to initiating transmission of the data via the connection while in the inactive state, that a cell reselection procedure is triggered; and
delay a start of the cell reselection procedure until completion of the transmission of the data via the connection while in the inactive state.

18. The apparatus of claim 11, wherein the instructions are further executable by the processor to cause the apparatus to:
resume transmission of the data subsequent to the cell reselection procedure.

* * * * *